(12) United States Patent
Watanabe et al.

(10) Patent No.: US 8,203,990 B2
(45) Date of Patent: Jun. 19, 2012

(54) WIRELESS-COMMUNICATION SYSTEM, WIRELESS-COMMUNICATION DEVICE, WIRELESS-COMMUNICATION METHOD, AND PROGRAM

(75) Inventors: Kazuhiro Watanabe, Kanagawa (JP); Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 930 days.

(21) Appl. No.: 11/954,567

(22) Filed: Dec. 12, 2007

(65) Prior Publication Data

US 2008/0151810 A1    Jun. 26, 2008

(30) Foreign Application Priority Data

Dec. 21, 2006    (JP) ................................ P2006-343661

(51) Int. Cl.
*G06F 15/16* (2006.01)
(52) U.S. Cl. ........ 370/315; 370/328; 370/331; 370/332; 370/338
(58) Field of Classification Search .......... 370/328–329, 370/331–334, 337–338
See application file for complete search history.

(56) References Cited

U.S. PATENT DOCUMENTS

| | | | |
|---|---|---|---|
| 2005/0276251 A1* | 12/2005 | Biddiscombe et al. | 370/338 |
| 2006/0256741 A1* | 11/2006 | Nozaki | 370/278 |

* cited by examiner

*Primary Examiner* — Jeffrey Pwu
*Assistant Examiner* — Sulaiman Nooristany
(74) *Attorney, Agent, or Firm* — Finnegan, Henderson, Farabow, Garrett & Dunner, L.L.P.

(57) ABSTRACT

A wireless-communication device configured to communicate with a different wireless-communication device provided outside a wireless-communication range through a path via a neighbor wireless-communication device includes first identification-information storage storing information about at least one first opposite station, second identification-information storage storing information about at least one second opposite station, a broadcast-signal-generation unit generating a broadcast signal including a propagation-node number and a transfer-finish-instruction signal, and transmitting the broadcast signal to another different wireless-communication device, and a broadcast-signal-transfer unit setting the transfer-finish-instruction signal, so as to instruct to finish transferring the broadcast signal, setting another propagation-node number, and transferring the broadcast signal to another different wireless-communication device when being instructed not to finish transferring the broadcast signal.

8 Claims, 22 Drawing Sheets

WIRELESS-COMMUNICATION SYSTEM, WIRELESS-COMMUNICATION DEVICE, WIRELESS-COMMUNICATION METHOD, AND PROGRAM

CROSS REFERENCES TO RELATED APPLICATIONS

The present invention contains subject matter related to Japanese Patent Application JP 2006-343661 filed in the Japanese Patent Office on Dec. 21, 2006, the entire contents of which are incorporated herein by reference.

BACKGROUND OF THE INVENTION

1. Field of the Invention

The present invention relates to a wireless-communication system, and particularly relates to a wireless-communication system configured to relay a frame between wireless-communication devices, a wireless-communication device provided in the wireless-communication system, a processing method used for the wireless-communication system and the wireless-communication device, and a program making a computer execute the processing method.

2. Description of the Related Art

As electronics have become smaller in size and more sophisticated, a user can carry and use the electronic with facility. Therefore, environments where a wireless-communication device can be connected to a network, as required, so as to perform communications have been demanded. As an example of the above-described environments, a network temporarily structured, as required, that is, wireless-ad-hoc-network technologies have been developed. The wireless ad-hoc network includes no predetermined access point. Namely, in the wireless ad-hoc network, wireless-communication devices including a computer, a personal-digital assistant (PDA), a mobile phone, etc. are autonomously distributed and connected to one another.

In the above-described wireless ad-hoc network, broadcast signals such as broadcast packets are propagated in sequence via different wireless-communication devices. The above-described signal propagation is referred to as flooding. Since the communication range of the wireless ad-hoc network can be easily increased by adding another wireless-communication device to the wireless ad-hoc network, the flooding should be restricted by using a mechanism and/or a method of some kind.

A predetermined technology is used, as the mechanism and/or the method used to restrict the flooding. According to the predetermined technology, an upper limit is predetermined for the number of times the broadcast signal is transferred, and the entire network is flooded with the broadcast signals until the value of the transfer number reaches the upper limit. For example, according to Ad hoc On-Demand Distance Vector (AODV) protocol proposed by Mobile Ad hoc Network Working Group (MANET WG) of Internet Engineering Task Force (IETF), the broadcast-signal transfer is restricted based on the transfer number, as disclosed in C. Perkins et al.: "Ad hoc On-Demand Distance Vector (AODV) Routing", RFC 3561, Network Working Group, IETF (http://www.ietf.org/rfc/rfc3561.txt).

SUMMARY OF THE INVENTION

In many cases, however, it is appropriate to measure the size of a network based on the number of wireless-communication devices (nodes) forming the network. Therefore, if the broadcast-signal propagation is restricted based on the transfer number alone, the network size may be significantly changed due to the positional relationship between the nodes.

For example, according to a network shown in FIG. 20, the total number of nodes forming the network is eighteen. If the upper-limit value of the number of times the flooding transfer is performed is determined to be "4", the range of the flooding transfer reaches a node #A (611) and a node #C (613) provided at both ends of a network centered on a node #B (612). Namely, every node provided in the network is included in the communication range of the node #B (612).

On the other hand, nine nodes are included in a flooding range 621 of the node #A (611), and eleven nodes are included in a flooding range 622 of the node #C (613). Therefore, for each of the nodes #A (611) and #C (613), the network size is smaller than the size of a network centered on the node #B (612). Further, in that case, it is difficult for the nodes #A (611) and #C (613) to communicate with each other.

However, if the upper-limit value of the transfer number is set to "7" or around, the nodes #A (611) and #C (613) can communicate with each other. However, since the network topology dynamically changes in the wireless ad-hoc network, the network size appropriate for the wireless-communication system should be considered sufficiently at the time where the upper-limit value of the transfer number is changed. Therefore, it is difficult to change the upper-limit value of the transfer number without knowing how many nodes are provided between the nodes #A (611) and #C (613).

Further, according to an example network shown in FIG. 21, the number of nodes forming the example network is forty-four. Therefore, the size of the network shown in FIG. 21 is larger than that of the network shown in FIG. 20. If the upper-limit value of the flooding-transfer number is determined to be "4", as is the case with FIG. 20, every node provided in the network is also included in the communication range of the node #B (612).

That is to say, even though the upper-limit value of the flooding-transfer number is fixed, the size of a network generated based on the upper-limit value significantly changes according to the number of adjacent nodes. According to the example network shown in FIG. 21, for generating a network that is centered on the node #B (612) and that is of the same size as that of the network shown in FIG. 20, the upper-limit value of the transfer number becomes "2". A flooding range 623 of the generated network includes twenty-four nodes.

If nodes provided around the node #B (612) of the example network shown in FIG. 21 do not exist, as shown FIG. 22, only nine nodes are included in a flooding range 624 where the upper-limit value of the transfer number is determined to be "2", so that the network size is significantly reduced. In FIG. 22, for generating a network that is centered on the node #B (612) and that is of the same size as that of the network shown in FIG. 20, the upper-limit value of the transfer number becomes "3" or around.

Thus, the above-described method of related art, the method being generated to restrict the flooding range only by using the upper-limit value of the transfer number, as in the past, may not be sufficient enough to generate networks approximately identical in size.

Therefore, the present invention has been achieved, so as to restrict the flooding range of a broadcast signal based on the network size in a wireless ad-hoc network.

According to an embodiment of the present invention, there is provided a wireless-communication device configured to communicate with a first different wireless-communication device provided outside a wireless-communication range through a path via a neighbor wireless-communication device. The wireless-communication device includes first identification-information storage configured to store information corresponding to at least one first opposite station existing inside a first wireless-communication range of the device itself, second identification-information storage configured to store information corresponding to at least one second opposite station that is existing inside a second wireless-communication range of the first opposite station and that is existing outside the first wireless-communication range, a broadcast-signal-generation unit configured to generate a broadcast signal and transmit the generated broadcast signal to at least one second different wireless-communication device, where the broadcast signal includes data on a propagation-node number obtained by subtracting a total number of a number of the first opposite station and a number of the second opposite station from a threshold value of a number of at least one third different wireless-communication device to which the broadcast signal should be propagated and/or a transfer-finish-instruction signal used to instruct to finish transferring the broadcast signal when the total number of the number of the first opposite station and the number of the second opposite station exceeds the threshold value, and a broadcast-signal-transfer unit that is configured to set the transfer-finish-instruction signal, so as to instruct to finish transferring the broadcast signal if the propagation-node number included in the broadcast signal is smaller than a number obtained by subtracting a number of the second opposite station existing inside the second wireless-communication range of the first opposite station that transmitted the broadcast signal from the number of the at least one second opposite station, and that is configured to set a number obtained by subtracting the number obtained by subtracting the number of the second opposite station existing inside the second wireless-communication range of the first opposite station that transmitted the broadcast signal from the number of the second opposite station from the propagation-node number of the broadcast signal, as another propagation-node number, and transfer the broadcast signal to at least one fourth different wireless-communication device when the transfer-finish-instruction signal of the broadcast signal transmitted from any of the at least one first opposite station does not instruct to finish transferring the broadcast signal. Subsequently, when the broadcast signal is transferred from the wireless-communication device, the number obtained by subtracting "the number of the second opposite station existing inside the second wireless-communication range of the first opposite station that transmitted the broadcast signal" from the number of the at least one second opposite station is compared to the propagation-node number included in the broadcast signal, so that information indicating whether or not the broadcast signal can be retransferred is incorporated into the broadcast signal at the time where the broadcast signal is transferred, as the transfer-finish-instruction signal.

Further, according to the above-described embodiment, the broadcast-signal-generation unit may incorporate data on the threshold value of a number of at least one time the broadcast signal should be transferred into the broadcast signal, as transfer-number data, and the broadcast-signal-transfer unit may update the transfer-number data incorporated into the broadcast signal each time the broadcast signal is transferred and stop transferring the broadcast signal when the value of the transfer-number data reaches a predetermined value. Subsequently, the broadcast-signal transfer can be restricted based on the propagation-node number and the broadcast-signal transfer can be restricted based on the transfer number.

Further, according to the above-described embodiment, the wireless-communication device may further include a status-notification-signal-generation unit configured to generate a status-notification signal including the information about the first opposite station and transmit the status-notification signal to the first opposite station, and a link-management unit configured to update the first identification-information storage and the second identification-information storage based on the information about the first opposite station, where the information about the first opposite station is included in the status-notification signal transmitted from the first opposite station. Subsequently, the first identification-information storage and the second identification-information storage can be updated via the status-notification signal.

According to another embodiment of the present invention, there is provided a wireless-communication system wherein each of wireless-communication devices communicates with a first different wireless-communication device provided outside a wireless-communication range through a path via a neighbor wireless-communication device. Each of the wireless-communication devices includes first identification-information storage configured to store information corresponding to at least one first opposite station existing inside a first wireless-communication range of the device itself, second identification-information storage configured to store information corresponding to at least one second opposite station that is existing inside a second wireless-communication range of the first opposite station and that is existing outside the first wireless-communication range, a broadcast-signal-generation unit configured to generate a broadcast signal and transmit the generated broadcast signal to at least one second different wireless-communication device, where the broadcast signal includes data on a propagation-node number obtained by subtracting a total number of a number of the first opposite station and a number of the second opposite station from a threshold value of a number of at least one third different wireless-communication device to which the broadcast signal should be propagated and/or a transfer-finish-instruction signal used to instruct to finish transferring the broadcast signal when the total number of the number of the first opposite station and the number of the second opposite station exceeds the threshold value, and a broadcast-signal-transfer unit that is configured to set the transfer-finish-instruction signal, so as to instruct to finish transferring the broadcast signal if the propagation-node number included in the broadcast signal is smaller than a number obtained by subtracting a number of the second opposite station existing inside the second wireless-communication range of the first opposite station that transmitted the broadcast signal from the number of the at least one second opposite station, and that is configured to set a number obtained by subtracting the number obtained by subtracting the number of the second opposite station existing inside the second wireless-communication range of the first opposite station that transmitted the broadcast signal from the number of the second opposite station from the propagation-node number of the broadcast signal, as another propagation-node number, and transfer the broadcast signal to at least one fourth different wireless-communication device when the transfer-finish-instruction signal of the broadcast signal transmitted from any of the at least one first opposite station does not instruct to finish transferring the broadcast signal. Subsequently, when the broadcast signal is transferred from the wireless-communication device provided in the wireless-communication system, the number obtained by subtracting "the number of the second opposite station existing inside the second wireless-communication range of the first opposite station that transmitted the broadcast signal" from the number of the at least one second opposite station is compared to the propagation-node number included in the broadcast signal, so that information indicating whether or not the broadcast signal can be retransferred is incorporated into the broadcast signal at the time where the broadcast signal is transferred, as the transfer-finish-instruction signal.

Further, according to another embodiment of the present invention, there is provided a wireless-communication method used in the case where each of wireless-communication devices communicates with a first different wireless-communication device provided outside a wireless-communication range through a path via a neighbor wireless-communication device. The wireless-communication device includes first identification-information storage configured to store information corresponding to at least one first opposite station existing inside a first wireless-communication range of the device itself, and second identification-information storage configured to store information corresponding to at least one second opposite station that is existing inside a second wireless-communication range of the first opposite station and that is existing outside the first wireless-communication range. The wireless-communication method includes the steps of determining whether or not a transfer-finish-instruction signal of a broadcast signal transmitted from any of the at least one first opposite station instructs to finish transferring the broadcast signal, setting the transfer-finish-instruction signal, so as to instruct to finish transferring the broadcast signal if a propagation-node number included in the broadcast signal is smaller than a number obtained by subtracting a number of the second opposite station existing inside the second wireless-communication range of the first opposite station that transmitted the broadcast signal from the number of the at least one second opposite station when the transfer-finish-instruction signal does not instruct to finish transferring the broadcast signal, and setting a number obtained by subtracting the number obtained by subtracting the number of the second opposite station existing inside the second wireless-communication range of the first opposite station that transmitted the broadcast signal from the number of the second opposite station from the propagation-node number of the broadcast signal, as another propagation-node number, and transferring the broadcast signal to at least one second different wireless-communication device when the transfer-finish-instruction signal does not instruct to finish transferring the broadcast signal. According to the above-described embodiment, a program making a computer execute the above-described steps is also provided. Subsequently, when the broadcast signal is transferred from the wireless-communication device, the number obtained by subtracting "the number of the second opposite station existing inside the second wireless-communication range of the first opposite station that transmitted the broadcast signal" from the number of the at least one second opposite station is compared to the propagation-node number included in the broadcast signal, so that information indicating whether or not the broadcast signal can be retransferred is incorporated into the broadcast signal at the time where the broadcast signal is transferred, as the transfer-finish-instruction signal.

According to the present invention, the flooding range of a broadcast signal can be restricted based on the network size in a wireless ad-hoc network.

DESCRIPTION OF THE PREFERRED EMBODIMENTS

Next, embodiments of the present invention will be described with reference to the attached drawings.

Figure 1:
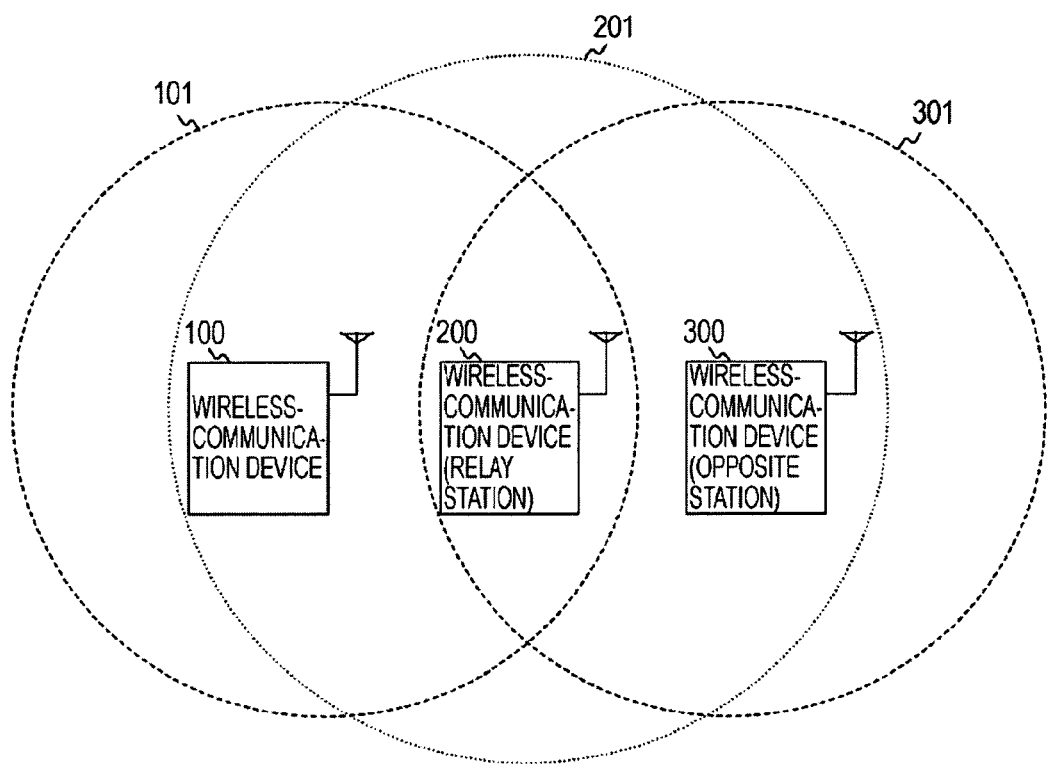
FIG. 1 shows a wireless-communication system according to an embodiment of the present invention.

FIG. 1 shows a wireless-communication system according to an embodiment of the present invention. In the wireless-communication system, wireless-communication devices 100, 200, and 300 wirelessly communicate with one another so that a wireless ad-hoc network is generated. Here, each of the wireless-communication devices 100, 200, and 300 operates in an autonomously distributed manner, and a control station such as an infrastructure network is not provided.

When a packet is transmitted from the wireless-communication device 100 to the wireless-communication device 300 in the above-described configuration, the wireless communication device 100 does not enter a communication range 301 of the wireless-communication device 300 and the wireless communication device 300 does not enter a communication range 101 of the wireless-communication device 100, so that it is difficult to directly perform wireless communications between the wireless-communication devices 100 and 300. Therefore, the wireless-communication device 200 with a communication range 201 including both the wireless-communication devices 100 and 300 temporarily receives the packet transmitted from the wireless-communication device 100, and transmits the transmitted packet to the wireless-communication device 300 functioning, as an opposite station. Thus, in an autonomous-distributed network, a different communication device functions, as a relay station, so that communications can be established between a predetermined station and an opposite station which does not exist in the communication range of the predetermined station.

Here, a one-to-one connection established between the wireless-communication device 100 and a relay station with which the communication device 100 directly communicates is referred to as a link. Further, the flow of data transmitted from the wireless-communication device 100 to the opposite station via the relay station is referred to as a path.

In the above-described embodiment, a single wireless-communication device functions, as a relay station. However, two or more stations may function, as relay stations. Further, even though the configuration of the wireless-communication device 100 will be described, each of other wireless-communication devices including the wireless-communication devices 200 and 300 has the same configuration as that of the wireless-communication device 100.

Figure 2:
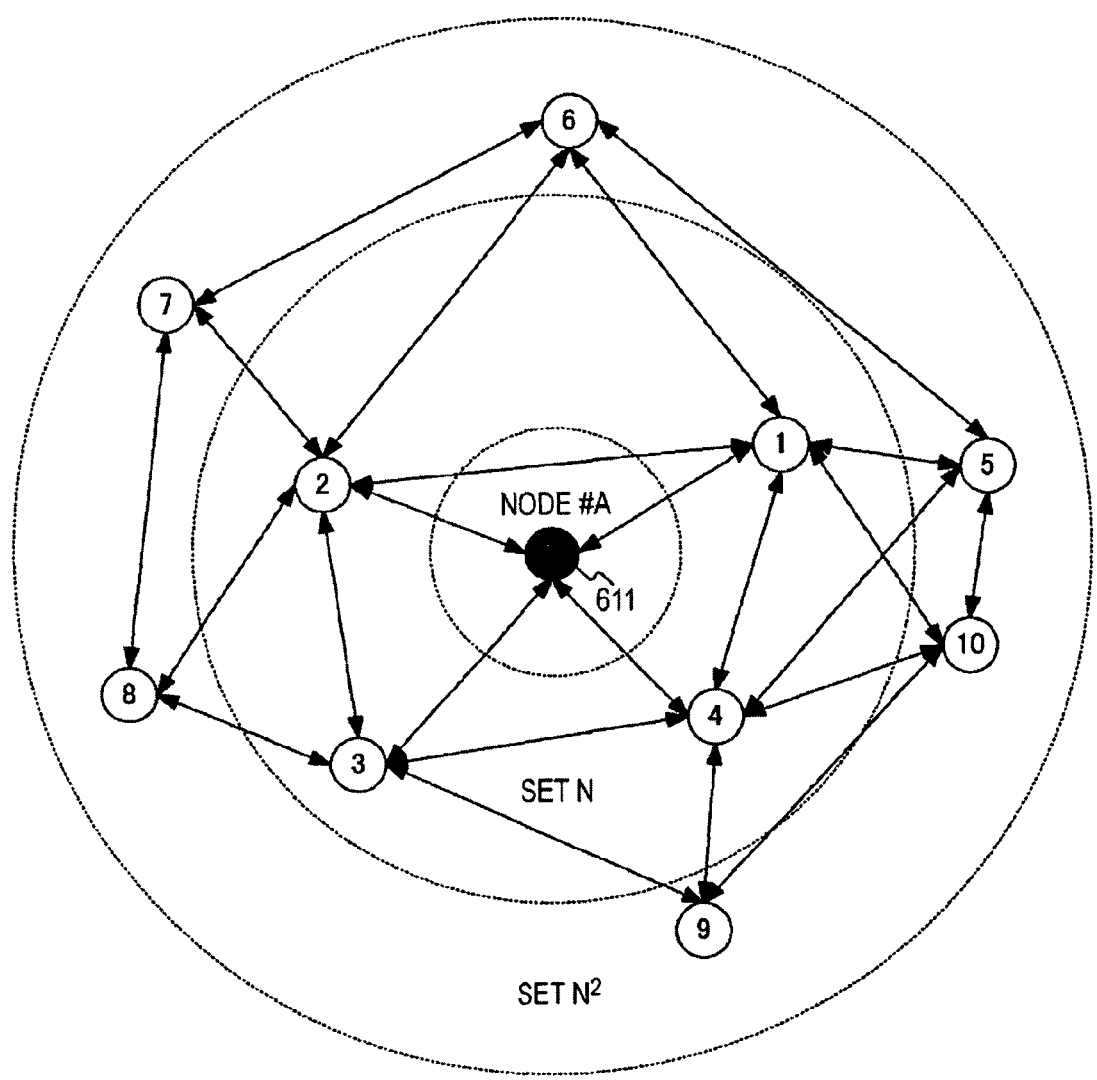
FIG. 2 shows the relationship between wireless-communication devices (nodes)

FIG. 2 illustrates the relationship between wireless-communication devices (nodes). When centered on a predetermined node such as a node #A (611), other nodes can be divided into three groups including set N, set $N^2$, and nodes that are not included in sets N and $N^2$.

Set N is a set of neighbor nodes distributed centering the node #A (611). Namely, set N includes a set of nodes other than the node #A, where the nodes are provided inside the wireless-communication range of the node #A (611). Therefore, it becomes possible to access from the node #A to any of nodes belonging to set N by a single hop. In the above-described embodiment, nodes 1, 2, 3, and 4 belong to the above-described set N.

Set $N^2$ is unions of neighbor nodes provided centering each of nodes belonging to set N, where the neighbor nodes do not include nodes belonging to set N. Therefore, it becomes possible to access from the node #A (611) to any of the nodes belonging to set $N^2$ by two hops. In the above-described embodiment, each of nodes 5, 6, 7, 8, 9, and 10 belongs to the above-described set $N^2$.

Information about nodes provided in the neighborhood of a self node is exchanged between the neighbor nodes and the self node by using a status-notification signal including a Hello packet or the like, so as to grasp sets N and $N^2$. Here, information about the above-described sets N and $N^2$ is usually used by the multi-point-relay (MPR) technology. According to another embodiment of the present invention, information about sets N and $N^2$ is collected by using an ordinary method.

Figure 3:
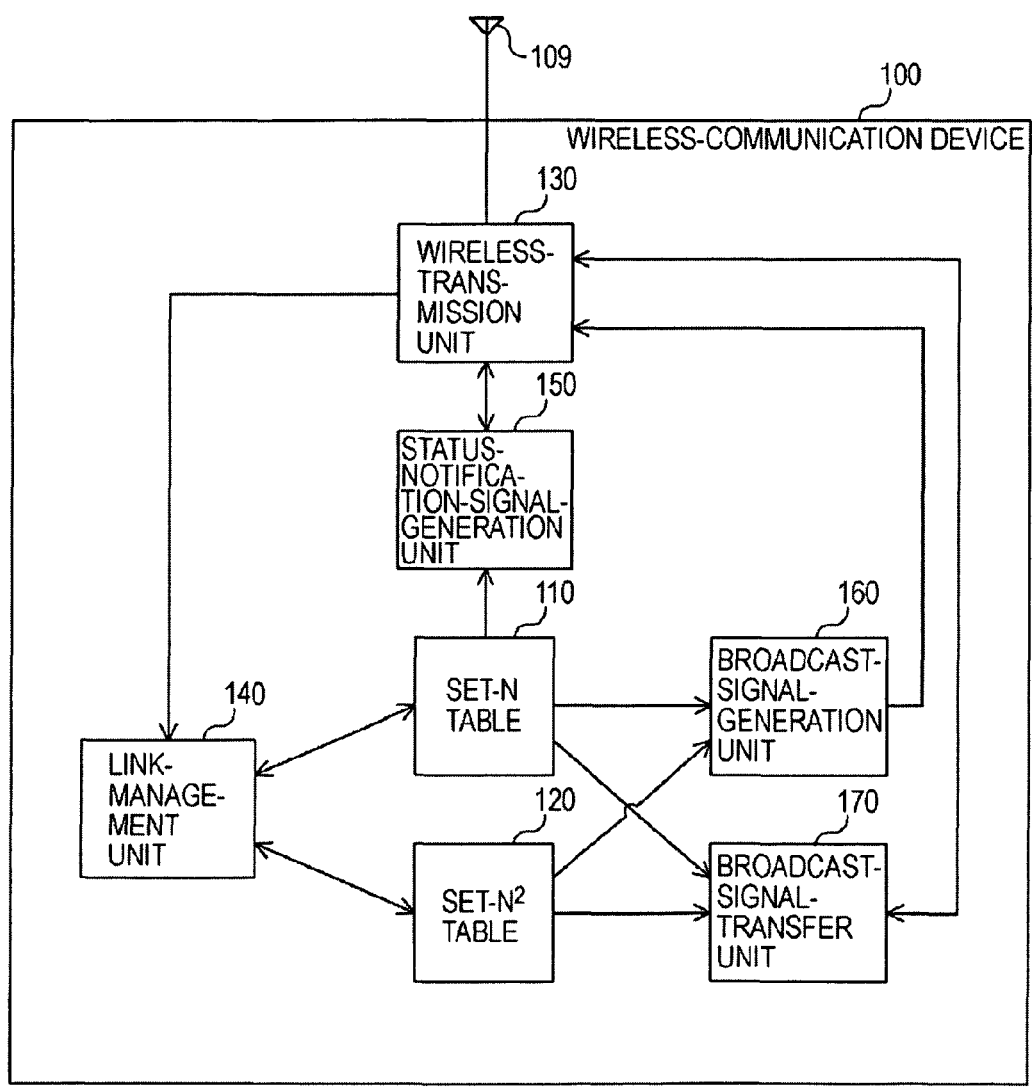
FIG. 3 shows an example functional configuration of a wireless-communication device according to another embodiment of the present invention.

FIG. 3 shows an example functional configuration of the wireless-communication device 100 according to another embodiment of the present invention. The wireless-communication device 100 includes a set-N table 110, a set-$N^2$ table 120, a wireless-transmission unit 130, a link-management unit 140, a status-notification-signal-generation unit 150, a broadcast-signal-generation unit 160, and a broadcast-signal-transfer unit 170.

The set-N table 110 is a table storing information about wireless-communication devices other than the wireless-communication device 100, where the wireless-communication devices belong to set N of the wireless-communication device 100. The information about the above-described wireless-communication devices includes information about the media-access-control (MAC) addresses of the wireless-communication devices, the MAC address of each of nodes provided in the neighborhood of the wireless-communication devices, the communication status of links generated between the wireless-communication devices, etc. Here, according to the above-described embodiment, only a wireless-communication device of which bidirectional communication status is determined to be stable is registered with the set-N table 110.

The set-$N^2$ table 120 is a table storing information about wireless-communication devices other than the wireless-communication device 100, where the wireless-communication devices belong to set $N^2$ of the wireless-communication device 100. The information about each of the above-described wireless-communication devices includes information about the MAC address of the wireless-communication device.

The wireless-transmission unit 130 wirelessly communicates with a different wireless-communication device. An antenna 109 is connected to the wireless-transmission unit 130 so that the wireless communications are performed between the wireless-transmission unit 130 and the different wireless-communication device via the antenna 109.

The link-management unit 140 receives the status-notification signal including the Hello packet or the like transmitted from the different wireless-communication device via the wireless-transmission unit 130. Then, the link-management unit 140 updates contents stored in the set-N table 110 and the set-$N^2$ table 120 based on information relating to the neighbor nodes, where the neighbor-node information is included in the status-notification signal, so that the link status is controlled.

The status-notification-signal-generation unit 150 is configured to generate the status-notification signal including the Hello packet or the like, where the status-notification signal includes information relating to a different wireless-communication device, that is, a neighbor node, where the information is stored in the set-N table 110. The generated status-notification signal is transmitted to another different wireless-communication device via the wireless-transmission unit 130.

The broadcast-signal-generation unit 160 is configured to generate a broadcast signal including a broadcast packet or the like, where the wireless-communication device 100 functions, as the transmission source of the broadcast signal. The generated broadcast signal is transmitted to another different wireless-communication device via the wireless-transmission unit 130.

When transferring the broadcast signal such as the broadcast packet, where the transmission source of the broadcast packet is another different wireless-communication device, the broadcast-signal-transfer unit 170 updates the contents of the broadcast signal. The updated broadcast signal is transmitted to another different wireless-communication device via the wireless-transmission unit 130.

Figure 4:
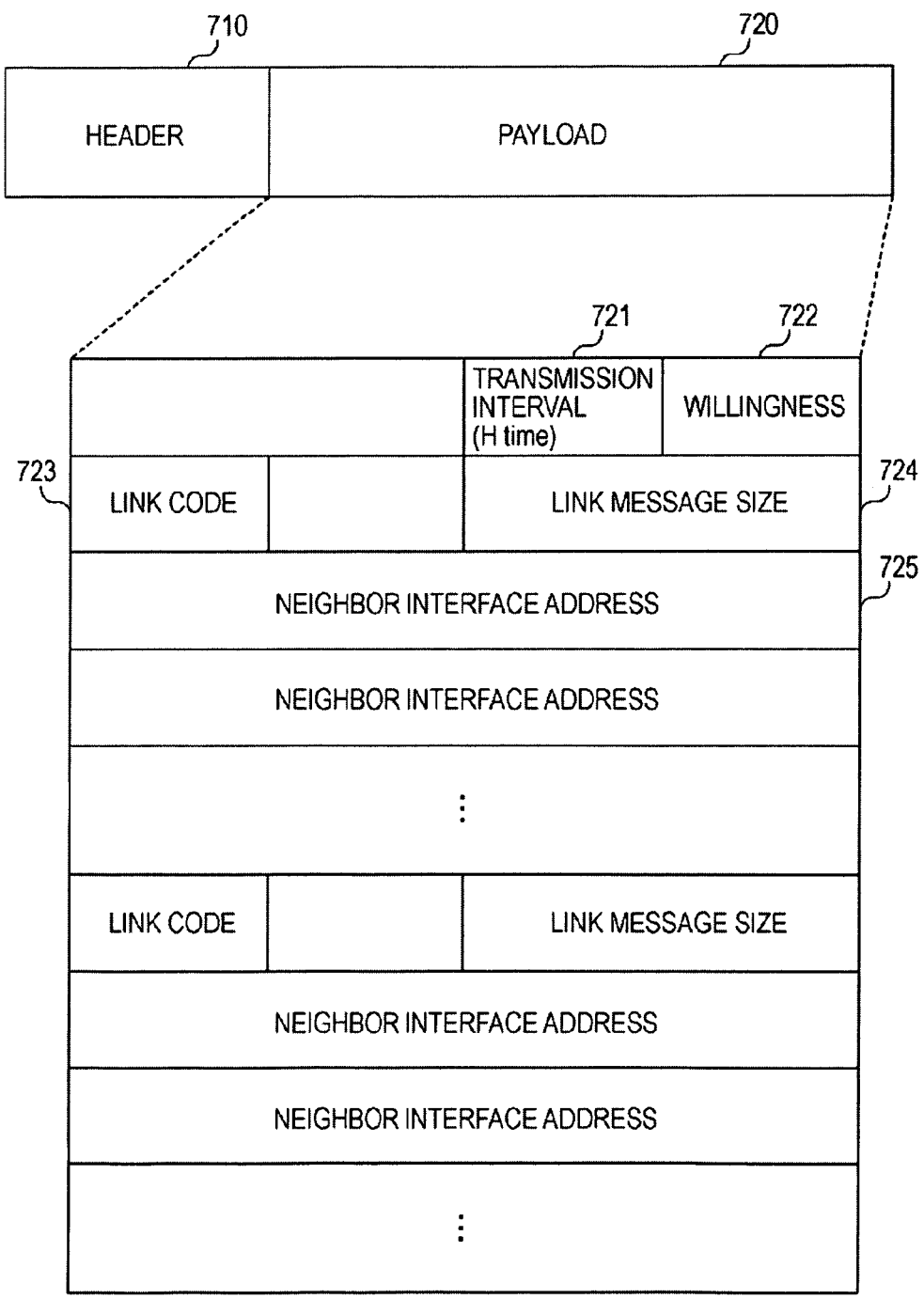
FIG. 4 shows the format of a Hello packet which is an example of a status-notification signal according to another embodiment of the present invention.

FIG. 4 shows the format of the Hello packet which is an example of a status-notification signal according to another embodiment of the present invention. The Hello packet is generated in compliance with Optimized Link State Routing (OLSR) protocol of IETF (RFC 3626) and includes a header 710 and a payload 720.

The payload 720 of the Hello packet includes transmission-interval (Htime) data 721, willingness data 722, a link code 723, link-message-size data 724, and neighbor-interface-address data 725.

The transmission-interval data 721 denotes a field showing each of intervals at which the Hello packets are transmitted. The willingness data 722 denotes a field showing an index used to select a node (MPR) configured to transfer data to a different node.

The link code 723 is a field storing information relating to a neighbor node. Information relating to the neighbor node includes information about the link type and the neighbor-node type. The link type shows the state of a link established between a self node and the neighbor node. For example, the link state shows that the link is bidirectional, unidirectional, and/or stable. The neighbor-node type shows the state of the neighbor node. Namely, the neighbor-node type shows that the neighbor node is wirelessly connected to the self node by at least one stable link, and/or selected, as an MPR, by a transmission source, for example.

The link-message-size data 724 is a field showing the length of the distance between the above-described link code 723 and the next link code 723 by the number of bytes. Since the number of the value of the neighbor-interface-address data 725 following the link-message-size data 724 is undefined, the size is determined based on the link-message-size data 724. The neighbor-interface-address data 725 is a field showing the address including the MAC address or the like of a neighbor node.

Thus, in the Hello packet, the address of the corresponding neighbor node is shown for each of link codes. Upon receiving the Hello packet transmitted from each of the wireless-communication devices, a different wireless-communication device can update the held contents of each of the set-N table 110 and the set-$N^2$ table 120, as required. That is to say, upon receiving a Hello packet transmitted from a neighbor node, where the neighbor node is the self node, the different wireless-communication device is wirelessly connected to the neighbor node via a bidirectional link and the different wireless-communication device registers the neighbor node with the set-N table 110. Further, upon receiving a Hello packet transmitted from a node provided in the neighborhood of the self node, where the node #A is provided in the neighborhood of the Hello packet, the node #A is registered with the set-$N^2$ table 120 unless the node #A is provided in the neighborhood of the self node.

Figure 5:
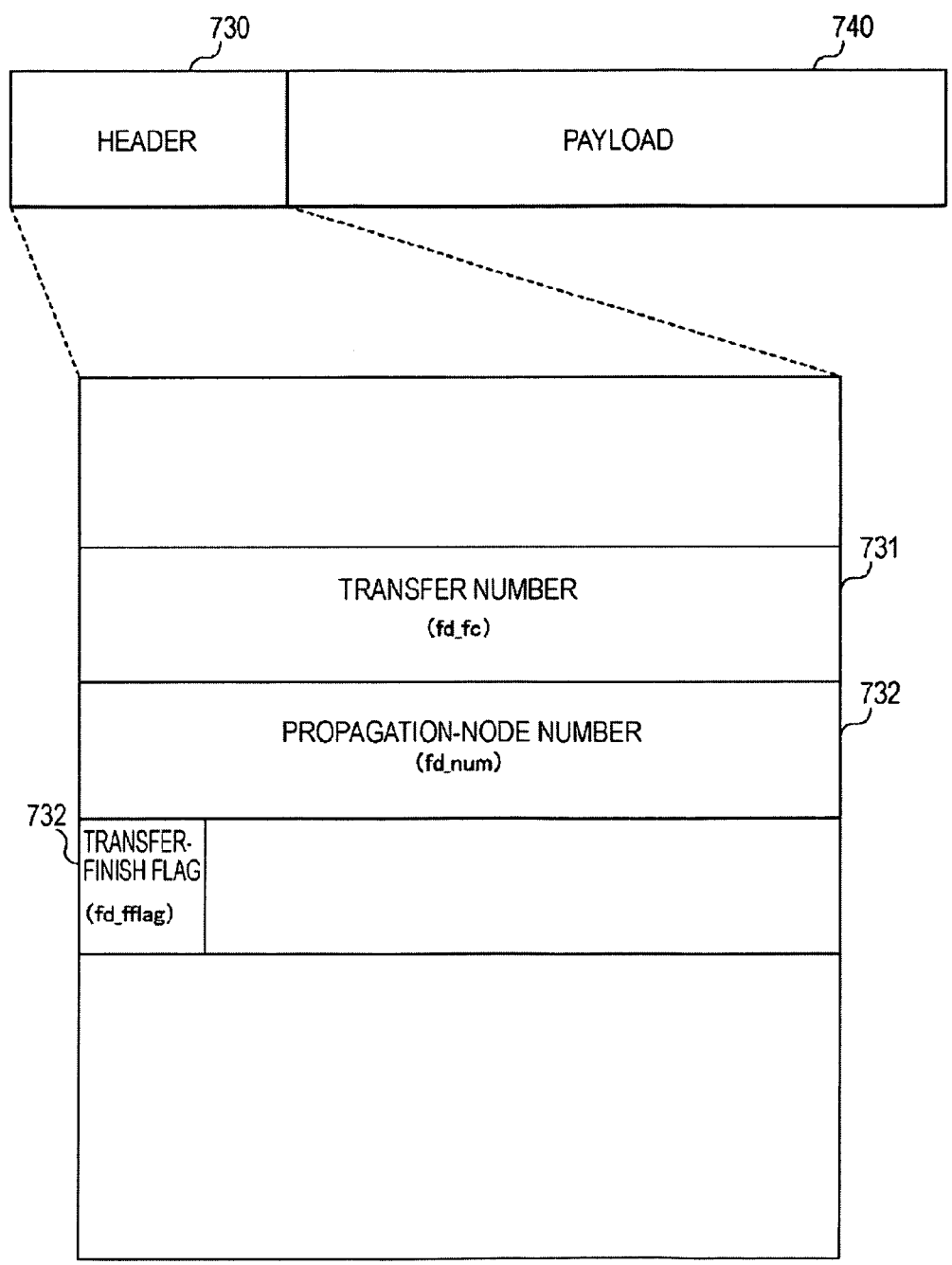
FIG. 5 shows the format of a broadcast packet which is an example of a broadcast signal according to another embodiment of the present invention.

FIG. 5 shows the format of a broadcast packet which is an example broadcast signal according to an embodiment of the present invention. The broadcast packet includes a header 730 and a payload 740. Here, the header 730 required to achieve the above-described embodiment will be described. The header 730 includes transfer-number (fd_fc) data 731, propagation-node-number (fd_num) data 732, and a transfer-finish flag (fd_fflag) 733.

The transfer-number data 731 is a field showing how many more times the broadcast packet can be transferred. The value of the transfer-number data 731 is decremented by one each time the broadcast packet is transferred between nodes. When the value of the transfer-number data 731 becomes a predetermined value (e.g., "one" or less), control is performed so that the broadcast packet is not transferred any more.

The propagation-node-number data 732 is a field showing to what number of nodes the broadcast packet can be propagated at a future time. The value of the propagation-node-number data 732 is decremented each time the broadcast packet is transferred between nodes. When the value of the propagation-node-number data 732 becomes a predetermined value (e.g., "zero" or less), control is performed so that the broadcast packet is not transferred any more.

The transfer-finish flag 733 is a field showing that the broadcast packet is not transferred any more. According to the above-described embodiment, when the value of the propagation-node-number data 732 reaches a predetermined value, the transfer-finish flag 733 is set to a value indicating "transfer is finished" (e.g., "one").

Operations of the wireless-communication device 100 according to another embodiment of the present invention will be described with reference to the attached drawings.

Figure 6:
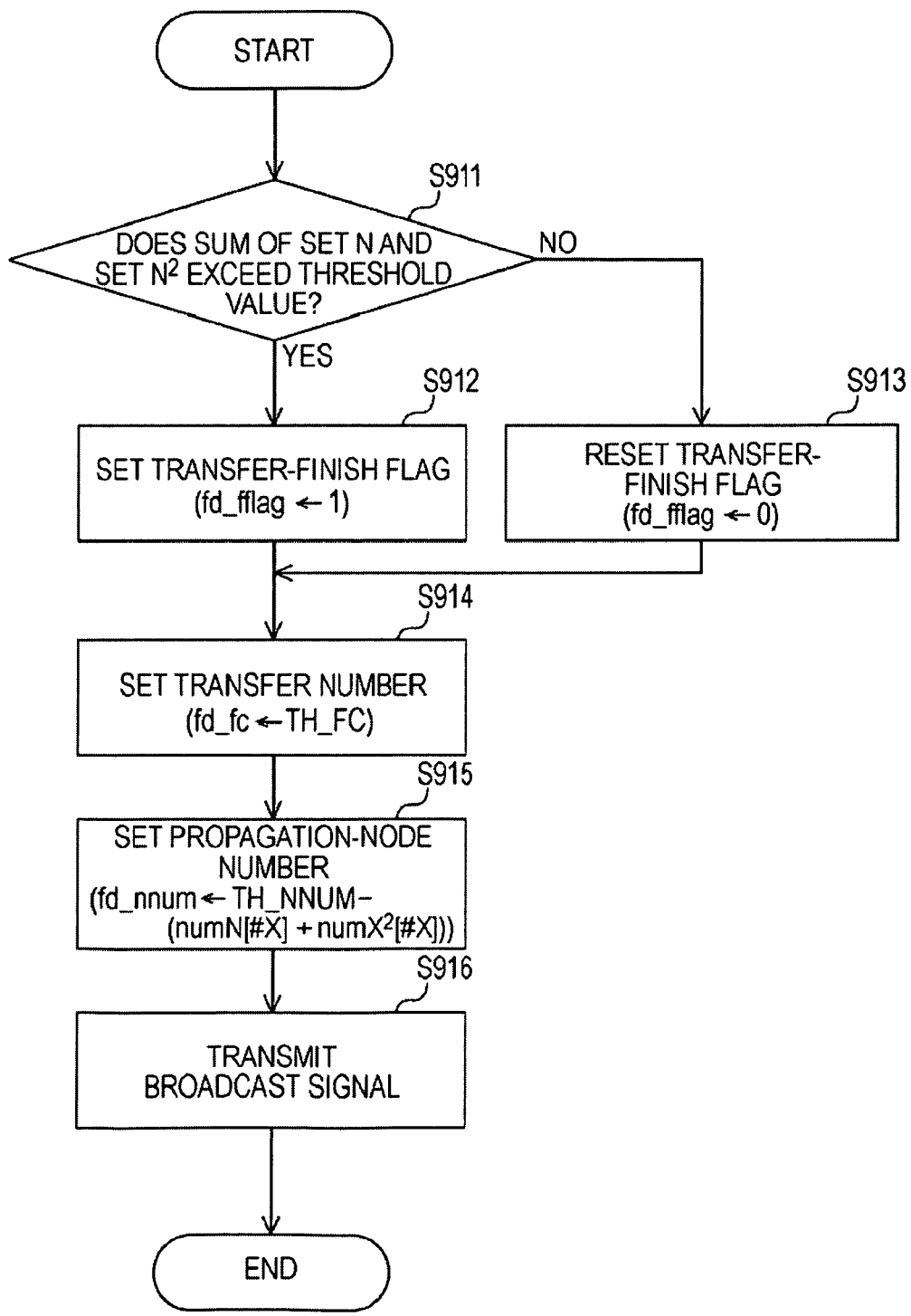
FIG. 6 is a flowchart showing example processing procedures performed by the wireless-communication device, so as to transmit the broadcast signal according to another embodiment of the present invention.

FIG. 6 is a flowchart illustrating example processing procedures performed by the above-described wireless-communication device 100, so as to transmit the broadcast signal. In the processing procedures, processing corresponding to steps S911, S912, S913, S914, and S915 is achieved by the broadcast-signal-generation unit 160 and the processing corresponding to step S916 is achieved by the wireless-transmission unit 130.

When a node #X functions, as the transmission source of a broadcast signal including the broadcast packet or the like, and transmits the broadcast signal, the total sum of the node number numN[#X], that is, the number of nodes belonging to set N of the node #X, and the node number $numN^2$[#X], that is, the number of nodes belonging to set $N^2$ of the node #X is compared to the threshold value TH_NUM of the propagation-node number, at step S911. The node number numN[#X] can be acquired by referring to the set-N table 110 of the node #X. Further, the node number $numN^2$[#X] can be acquired by referring to the set-$N^2$ table 120 of the node #X. Further, the threshold value TH_NUM of the propagation-node number denotes parameters that can be determined in advance according to the size of an expected network.

If a result of the comparison made at step S911 shows that the total sum of the number numN[#X] of the nodes belonging to set N and the number $numN^2$[#X] of the nodes belonging to set $N^2$ exceeds the threshold value TH_NUM of the propagation-node number, the transfer-finish flag 733 of the broadcast signal is set to a value indicating "transfer is finished" (e.g., "1") so that the broadcast-signal transfer is not performed at the transmission destination, at step S912. On the other hand, if the total sum of the number numN[#X] of the nodes belonging to set N and the number $numN^2$[#X] of the nodes belonging to set $N^2$ does not exceed the threshold value TH_NUM of the propagation-node number, the transfer-finish flag 733 is reset to a value indicating "transfer is not finished" (e.g., "0") so that the broadcast-signal transfer is not restricted at the transmission destination, at step S913.

Further, the threshold value of the transfer number TH_FC is set in the transfer-number data 731 on the broadcast signal, at step S914. The transfer-number-threshold value TH_FC denotes parameters determined in advance according to the range of flooding which occurs in the expected network.

Further, a value obtained by subtracting the total sum of the number numN[#X] of the nodes belonging to set N and the number $numN^2$[#X] of the nodes belonging to set $N^2$ from the threshold value TH_NUM of the propagation-node number is set in the propagation-node-number data 732, at step S915. Subsequently, it becomes possible for a node that received the broadcast signal to determine whether or not the broadcast signal can be transferred according to the number of surrounding nodes. More specifically, the surrounding-node number denotes the total sum of the number numN[#X] of the nodes belonging to set N and the number $numN^2$[#X] of the nodes belonging to set $N^2$.

After that, the broadcast signal is transmitted by the wireless-transmission unit 130, at step S916.

Here, if the total sum of the number numN[#X] of the nodes belonging to set N and the number $numN^2$[#X] of the nodes belonging to set $N^2$ exceeds the threshold value TH_NUM of the propagation-node number, at step S915, the value of the propagation-node-number data 732 is set to "0", where at least one node exists, as neighbor node, and the number of the at least one node exceeds the threshold value TH_NUM of the propagation-node number. In that case, a value indicating "transfer is finished" is set in the transfer-finish flag 733, at step S912. Therefore, even though the broadcast signal is transmitted, the broadcast signal is not transferred from the transmission destination.

Figure 7:
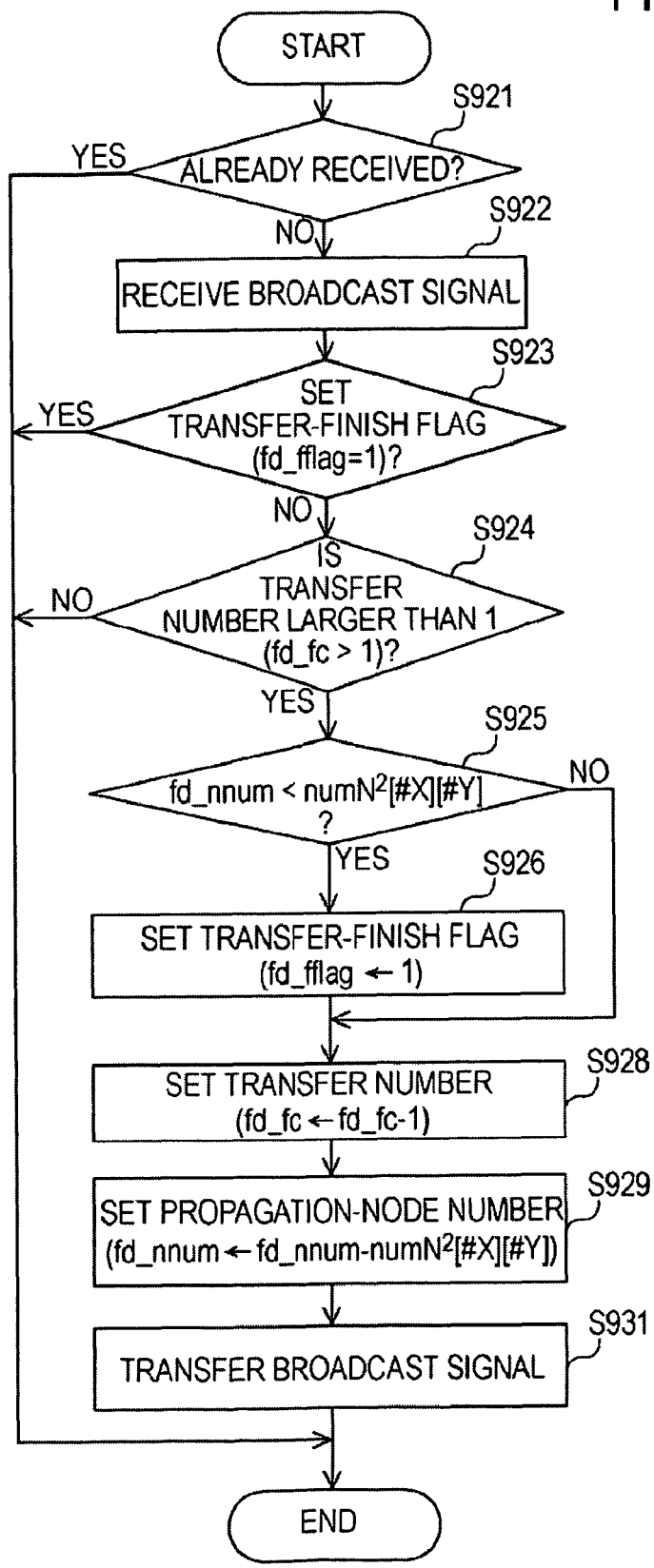
FIG. 7 is a flowchart showing example processing procedures performed by the wireless-communication device, so as to transfer the broadcast signal according to another embodiment of the present invention.

FIG. 7 is a flowchart illustrating example processing procedures performed by the wireless-communication device 100 according to another embodiment of the present invention, so as to transfer the broadcast signal. In the processing procedures, the processing corresponding to steps S923, S924, S925, S926, S928, and S929 is achieved by the broadcast-signal-transfer unit 170 and the processing corresponding to steps S921, S922, and S931 is achieved by the wireless-transmission unit 130.

Upon receiving the broadcast signal, a node #Y performs redundancy checking for a reception packet, at step S921. If the reception packet is determined to be the same as a packet that had already been transmitted to the node #Y, the reception packet is abandoned without being transmitted to an upper layer.

If the reception packet is a new packet, the packet (broadcast signal) is passed to the upper layer, at step S922, and it is determined whether or not a value indicating "transfer is finished" is set to the transfer-finish flag 733 of the broadcast signal, at step S923. If the value indicating "transfer is finished" is set in the transfer-finish flag 733, flooding processing is terminated immediately. On the other hand, if a value indicating "transfer is not finished" is set in the transfer-finish flag 733, it is checked whether or not the flooding should be restricted based on the transfer-number data 731, at step S924.

If the value of the transfer-number data 731 reaches its upper limit, at step S924, the transfer processing is not performed and the flooding processing is finished. On the contrary, if the value of the transfer-number data 731 does not reach its upper limit, it is checked whether or not the flooding should be restricted based on the propagation-node-number data 732, at step S925.

For determining whether or not the flooding should be restricted based on the propagation-node-number data 732, at step S925, the node #Y that received the broadcast signal uses the number $numN^2[\#X][\#Y]$ of nodes belonging to set $N^2$ generated in consideration of the node #X that transmitted the broadcast signal. The node number $numN^2[\#X][\#Y]$ denotes the number of the node #X and at least one node having no link of the nodes belonging to set $N^2$ of the node #Y. That is to say, in the case where the node #Y transfers the broadcast signal to a neighbor node, and the broadcast signal is retransferred from the neighbor node to at least one different node so that the broadcast signal is propagated to the at least one different node, the node number $numN^2[\#X][\#Y]$ denotes the number of the at least one different node. The above-described node can be determined by comparing the MAC address of a wireless-communication device registered with the set-$N^2$ table 120 to that of a node provided in the neighborhood of a wireless-communication device registered with the set-N table 110.

Then, if the node number $numN^2[\#X][\#Y]$ exceeds the propagation-node number 732, the value of the transfer-finish flag 733 of the broadcast signal is set to the value indicating "transfer is finished" (e.g., "1"), at step S926, so that the broadcast signal is not retransferred from the transfer destination. On the contrary, if the node number $numN^2[\#X][\#Y]$ does not exceed the value of the propagation-node-number data 732, the value of the transfer-finish flag 733 is retained, as the value indicating "transfer is not finished" (e.g., "0") so that the retransfer of the broadcast signal is not restricted at the transfer destination.

Further, a value obtained by decrementing the value of the transfer-number data 731 obtained at the broadcast-signal reception time by one is set in the transfer-number data 731 of the broadcast signal, at step S928.

Further, a value obtained by subtracting the node number $numN^2[\#X][\#Y]$ from the value of the propagation-node-number data 732 obtained at the broadcast-signal-reception time is set in the propagation-node-number data 732, at step S929. Namely, when the node #Y transfers the broadcast signal to a neighbor node, the broadcast signal is retransferred from the neighbor node to at least one different node, which means that the broadcast signal is propagated to the at least one different node. The number of the at least one different node is subtracted from the value of the propagation-node-number data 732 so that it becomes possible for the neighbor node which is the transfer destination to determine whether or not the broadcast signal can be retransferred.

After that, the broadcast signal is transferred by the wireless-transmission unit 130, at step S931.

Next, processing according to another embodiment of the present invention will be described based on specific examples.

Each of FIGS. 8, 9, 10, and 11 shows a first specific example of the above-described embodiment. According to the first specific example, the threshold value of the transfer number TH_FC is determined to be "4" and the threshold value of the propagation-node number TH_NUM is determined to be "12".

Figure 8:
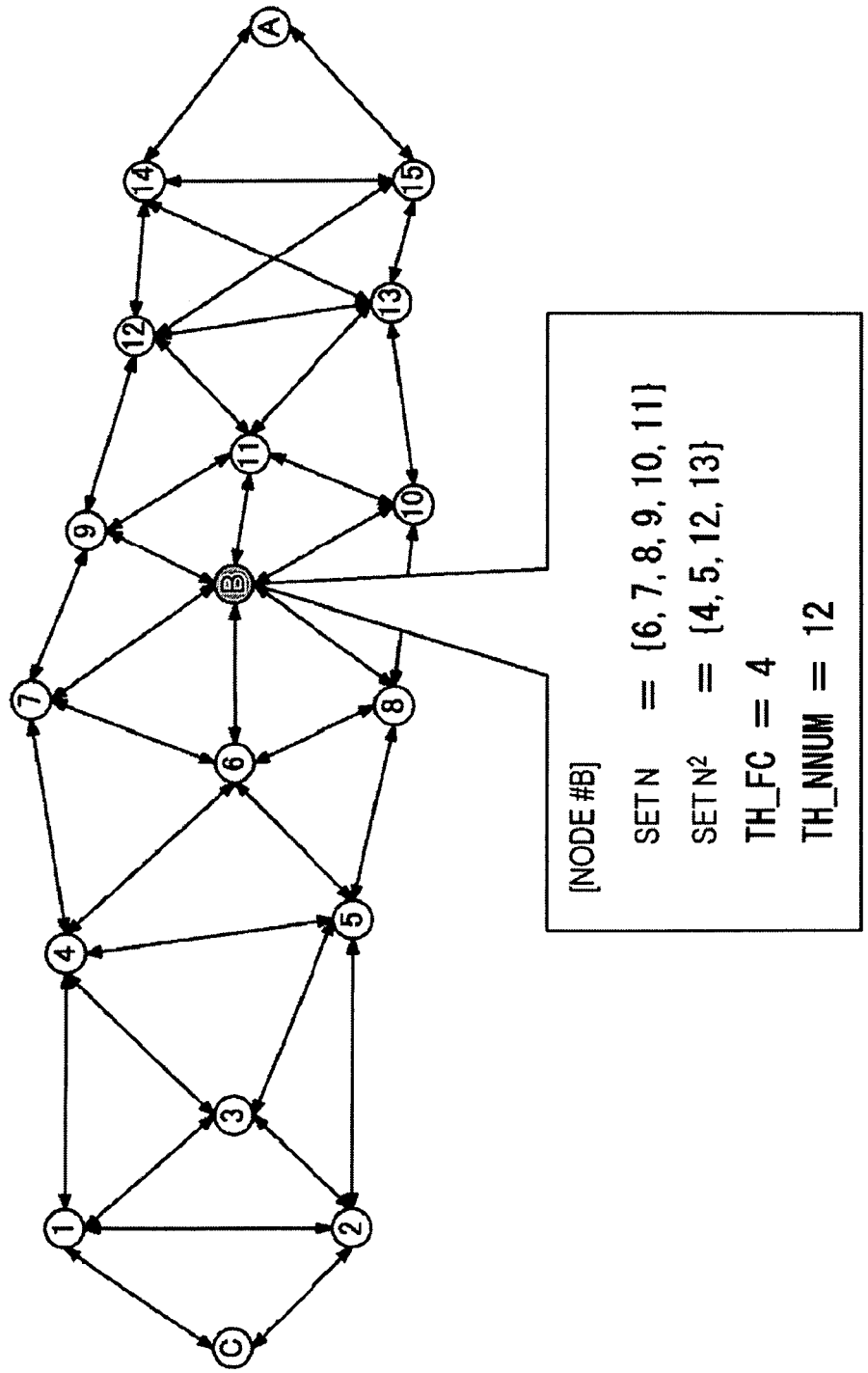
FIG. 8 shows the first specific example according to another embodiment of the present invention.

As shown in FIG. 8, the broadcast signal is transmitted from the node #B functioning, as the transmission source. For the node #B, set N includes six nodes including nodes #6, #7, #8, #9, #10, and #11. Further, set $N^2$ includes four nodes including nodes #4, #5, #12, and #13. Therefore, the total sum of the number numN[#B] of nodes belonging to set N of the node #B and the number $numN^2[\#B]$ of nodes belonging to set $N^2$ of the node #B becomes "10". Since the total sum does not exceed the propagation-node number TH_NUM which is "12", the value "2" obtained by subtracting the value "10" from the propagation-node-number-threshold value TH_NUM is set in the propagation-node-number data 732 of the broadcast signal. Further, the threshold value TH_FC which is "4" is set in the transfer-number data 731, and the broadcast signal is transmitted. The broadcast signal is transmitted to six nodes including the nodes #6, #7, #8, #9, #10, and #11 corresponding to set N.

Figure 9:
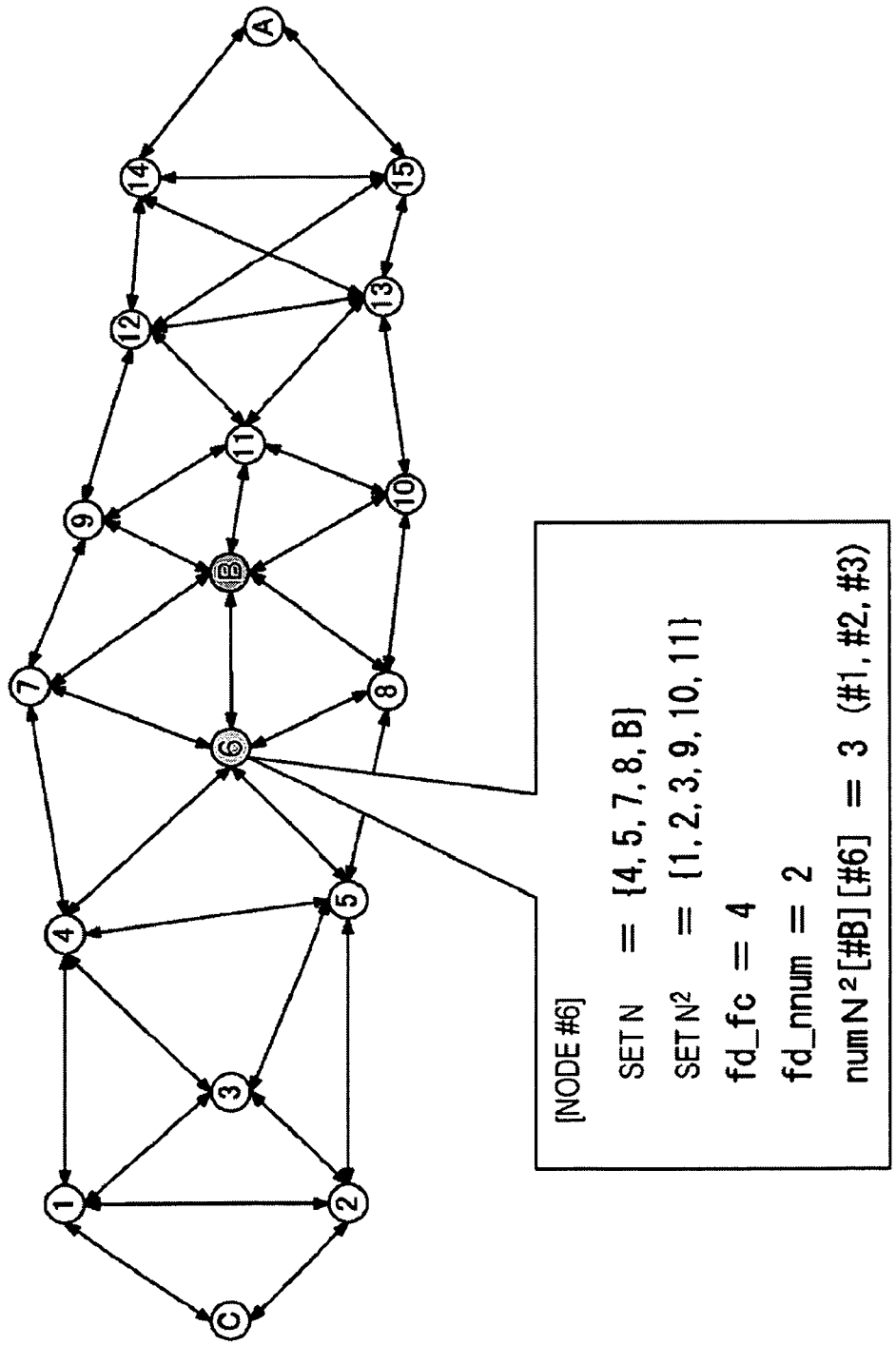
FIG. 9 also shows the first specific example.

As shown in FIG. 9, for the node #6, five nodes including the nodes #4, #5, #7, #8, and #B correspond to set N. Further, six nodes including the nodes #1, #2, #3, #9, #10, and #11 correspond to set $N^2$. In that case, of the nodes corresponding to set $N^2$ of the node #6, each of three nodes including the nodes #1, #2, and #3 does not have a link to the node #B. Subsequently, the value of the node number numN2[#B][#6] becomes "3". Since the value "3" exceeds the value "2" of the propagation-node-number data 732, a value indicating "transfer is finished" is set in the transfer-finish flag 733. Then, the value "0" is set in the propagation-node-number data 732 and the value "3" is set in the transfer-number data 731, and the broadcast signal is transmitted. Of the nodes corresponding to set N, the broadcast signal may be transmitted to two nodes including the nodes #4 and #5 that had not yet received the broadcast signal. When the broadcast signal is transmitted to the nodes #4 and #5, each of the nodes #4 and #5 does not transfer the broadcast signal, since the value indicating "transfer is finished" is set in the transfer-finish flag 733 of the broadcast signal.

Figure 10:
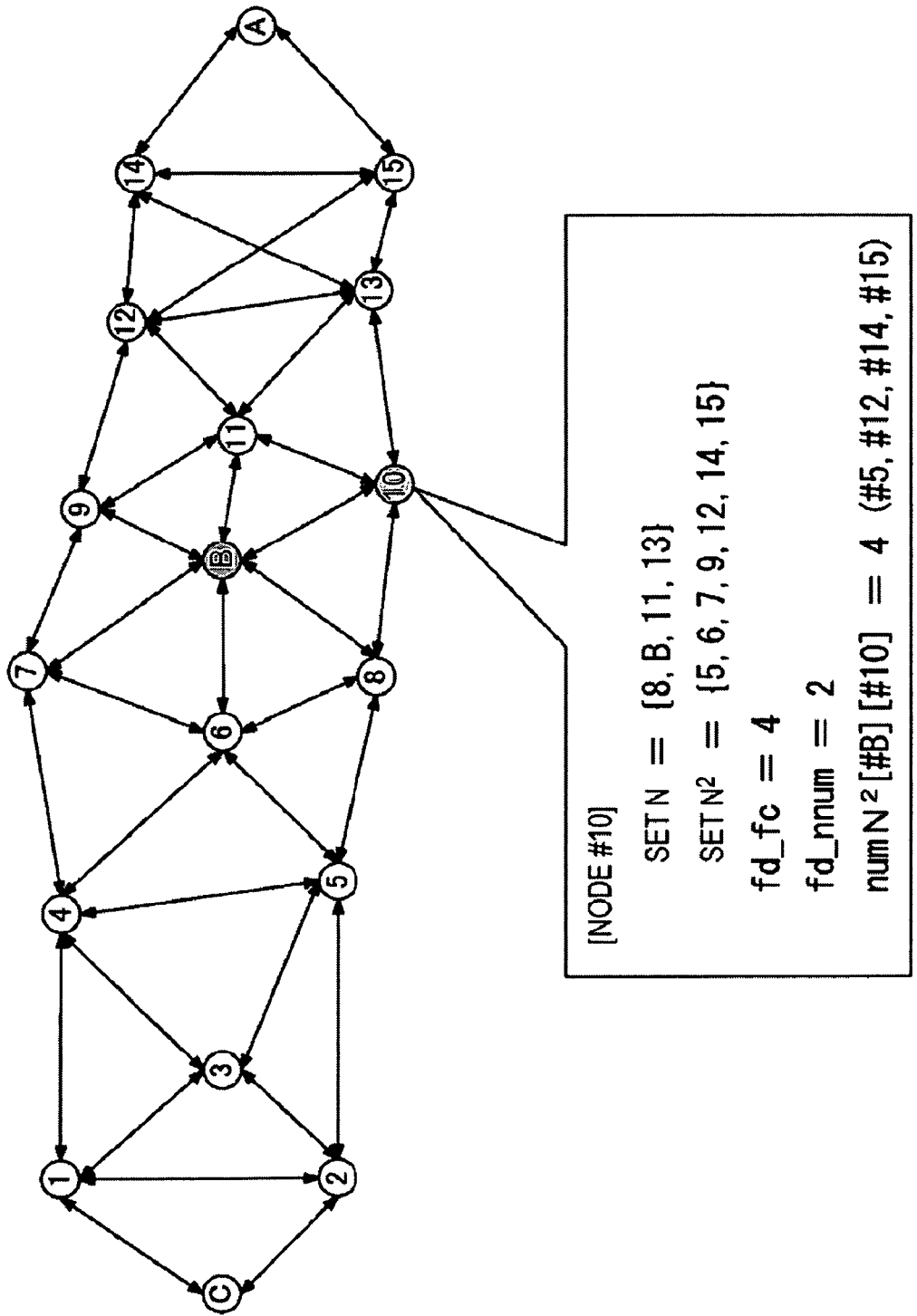
FIG. 10 also shows the first specific example.

As shown in FIG. 10, for the node #10, four nodes including the nodes #8, #B, #11, and #13 correspond to set N. Further, seven nodes including the nodes #5, #6, #7, #9, #12, #14, and #15 correspond to set $N^2$. In that case, of the nodes corresponding to set $N^2$ of the node #10, each of four nodes including the nodes #5, #12, #14, and #15 does not have a link to the node #B. Subsequently, the value of the node number $numN^2[\#B][\#10]$ becomes "4". Since the value "4" exceeds the value "2" of the propagation-node-number data 732, a value indicating "transfer is finished" is set in the transfer-finish flag 733. Then, the value "0" is set in the propagation-node-number data 732 and the value "3" is set in the transfer-number data 731, and the broadcast signal is transmitted. Of the nodes corresponding to set N, the broadcast signal may be transmitted only to the node #13 that had not yet received the broadcast signal. When the broadcast signal is transmitted to the node #13, the node #13 does not transfer the broadcast signal, since the value indicating "transfer is finished" is set in the transfer-finish flag 733 of the broadcast signal.

Figure 11:
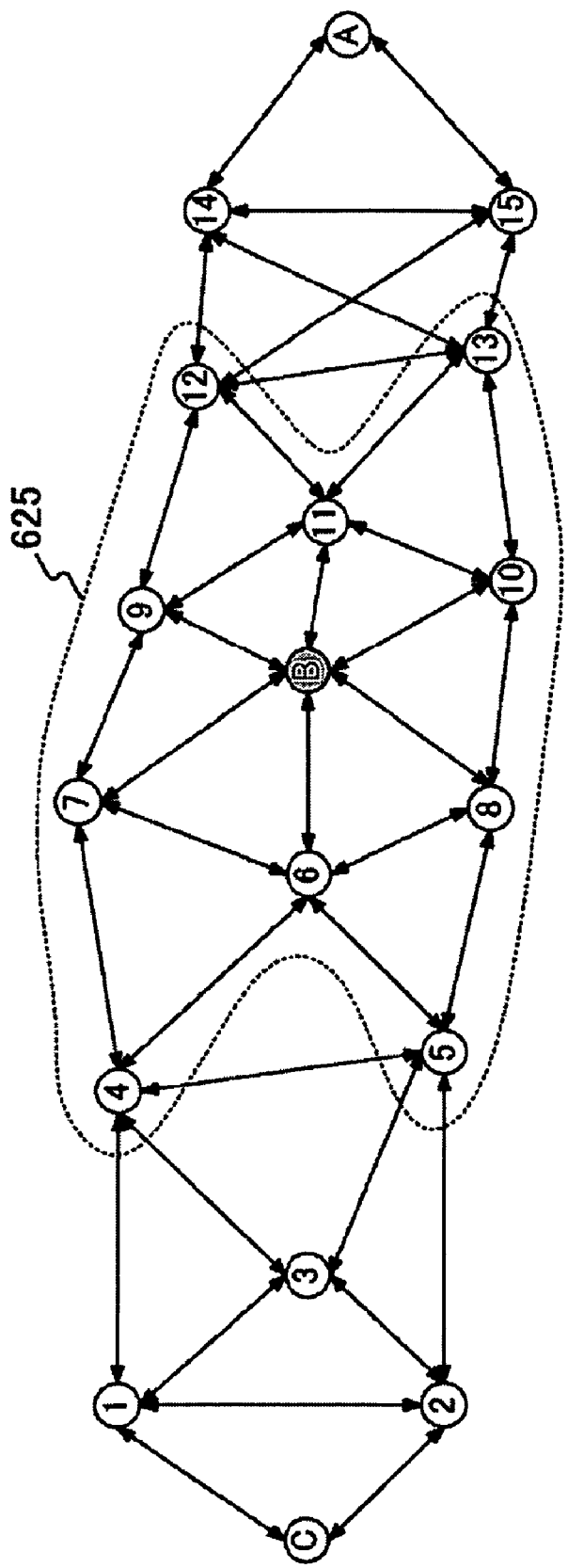
FIG. 11 also shows the first specific example.

FIG. 11 shows a flooding range 625 used in the first specific example. In the first specific example, the value of the propagation-node-number-threshold value TH_NUM is "12" and the number of nodes to which the broadcast signal is actually propagated is ten. In the first specific example, the broadcast-signal propagation is performed, so as not to exceed the threshold value of the propagation-node number. However, according to the network topology, flooding may be performed for a predetermined number of nodes, where the predetermined number exceeds the threshold value. According to a control method according to another embodiment of the present invention, the flooding range is not restricted, so as not to exceed the threshold value with accuracy. Namely, the flooding range is restricted so that the network size is roughly limited based on the threshold value.

Each of FIGS. 12, 13, 14, 15, 16, 17, 18, and 19 shows a second specific example of the above-described embodiment. According to the second specific example, the transfer-number-threshold value TH_FC is determined to be "10" and the propagation-node-number-threshold value TH_NUM is determined to be "10".

Figure 12:
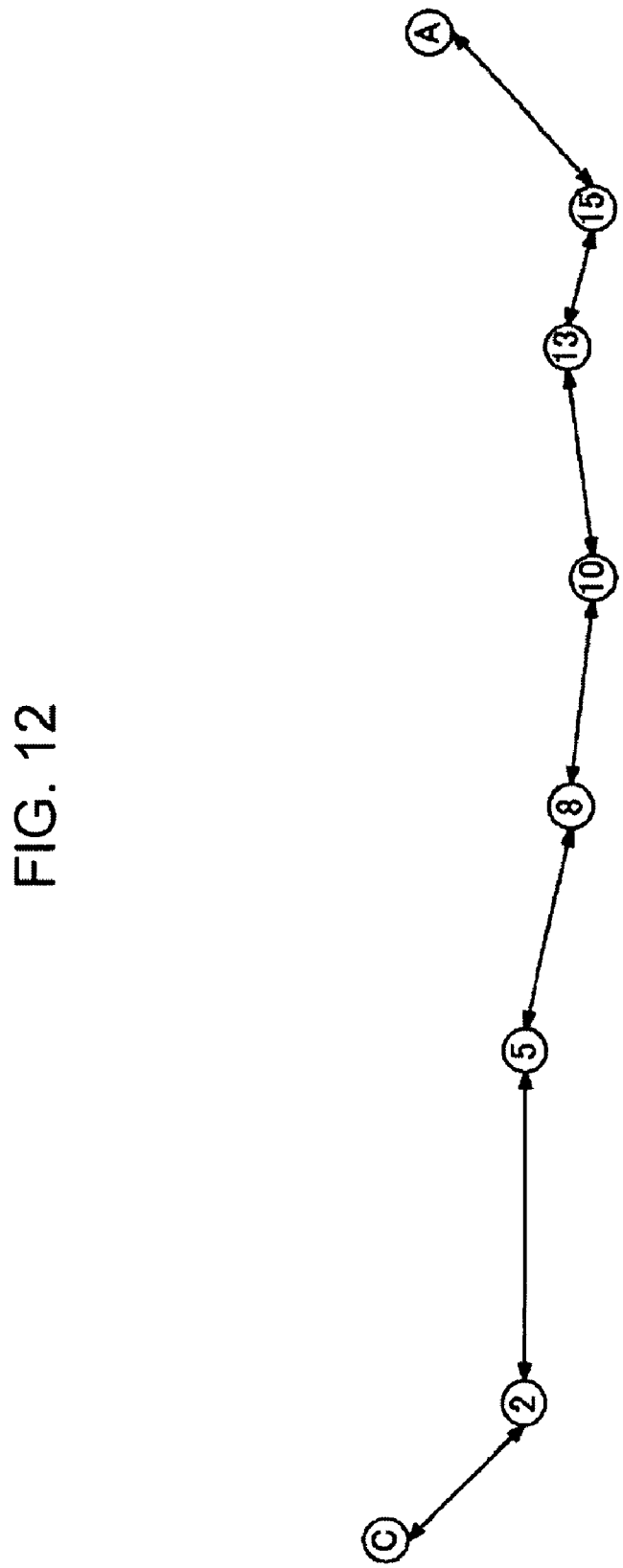
FIG. 12 shows the second specific example according to another embodiment of the present invention.

As shown in FIG. 12, in the second specific example, eight nodes are connected in series. In that case, for controlling the transfer of the broadcast signal based on the transfer number only, the threshold value of the transfer number should be set, as "7" or more. Otherwise, it becomes difficult to establish communications between the nodes provided at both the ends of the network, that is, the nodes #A and #C. For example, the network size may be significantly increased by simply determining the value of the transfer-number-threshold value TH_FC to be "10". However, by further determining the value of the propagation-node-number-threshold value TH_NUM to be "10" in addition to the above-described determination, the network size can be reduced so that the value of the node number becomes 10 or so and the communications can be established between the nodes provided at both the ends. Then, if the node number increases and changes afterwards, the flooding can be restricted so that the network size can be reduced to an expected network size appropriate for the node #A, even though it becomes difficult to establish communications between the terminals (the nodes #A and #C) provided at both ends of the network.

Figure 13:
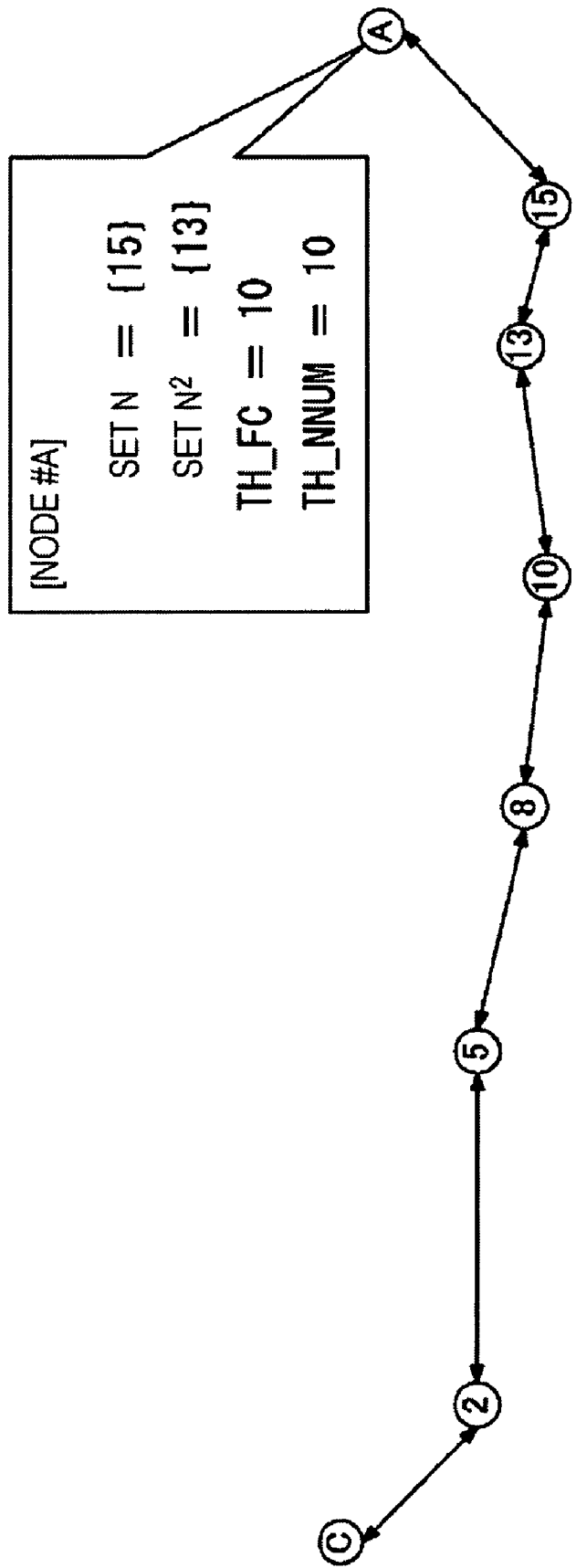
FIG. 13 also shows the second specific example.

As shown in FIG. 13, the broadcast signal is transmitted from the node #A functioning, as the transmission source. For the node #A, only the node #15 belongs to set N. Further, only the node #13 belongs to set $N^2$. Therefore, the total sum of the number numN[#A] of the node belonging to set N of the node #A and the number numN$^2$[#A] of the node belonging to set $N^2$ of the node #A becomes "2". Since the value of the total sum does not exceed the propagation-node-number-threshold value TH_NUM which is "10", the value "8" obtained by subtracting the value "2" from the propagation-node-number-threshold value TH_NUM is determined to be the value of the propagation-node-number data 732 of the broadcast signal. Further, the value "10" which is the threshold value TH_FC is set in the transfer-number data 731, a value indicating "transfer is not finished" is set in the transfer-finish flag 733, and the broadcast signal is transmitted only to the node #15 belonging to set N.

Figure 14:
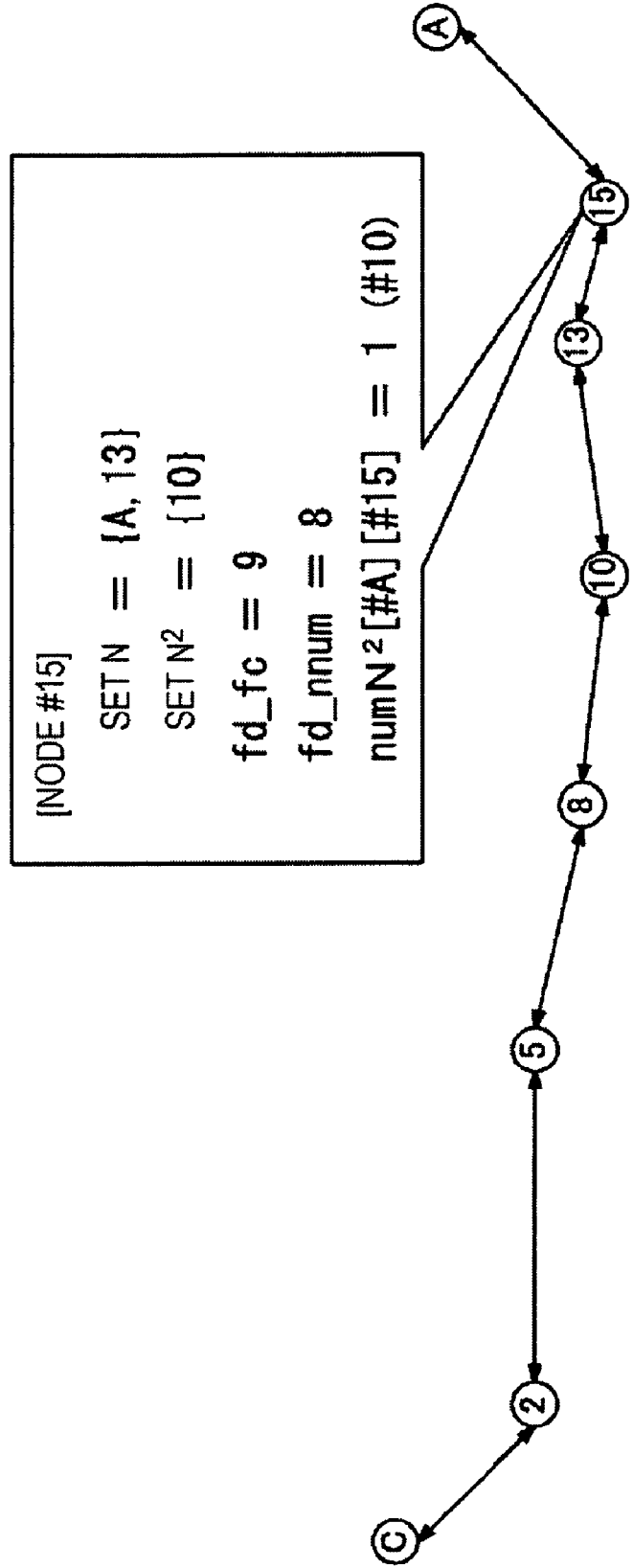
FIG. 14 also shows the second specific example.

As shown in FIG. 14, for the node #15, two nodes including the nodes #A and #13 belong to set N. Further, only the node #10 belongs to set $N^2$. In that case, the node #10 belonging to set $N^2$ of the node #15 does not have a link to the node #A. Subsequently, the value of the node number numN$^2$[#A][#15] becomes "1", which does not exceed the value "8" of the propagation-node-number data 732. Therefore, a value indicating "transfer is not finished" is retained in the transfer-finish flag 733. Further, the value "7" is set in the propagation-node-number data 732, the value "8" is set in the transfer-number data 731, and the broadcast signal is transmitted. Of the nodes belonging to set N, only the node #13 that had not yet received the broadcast signal may receive the broadcast signal.

Figure 15:
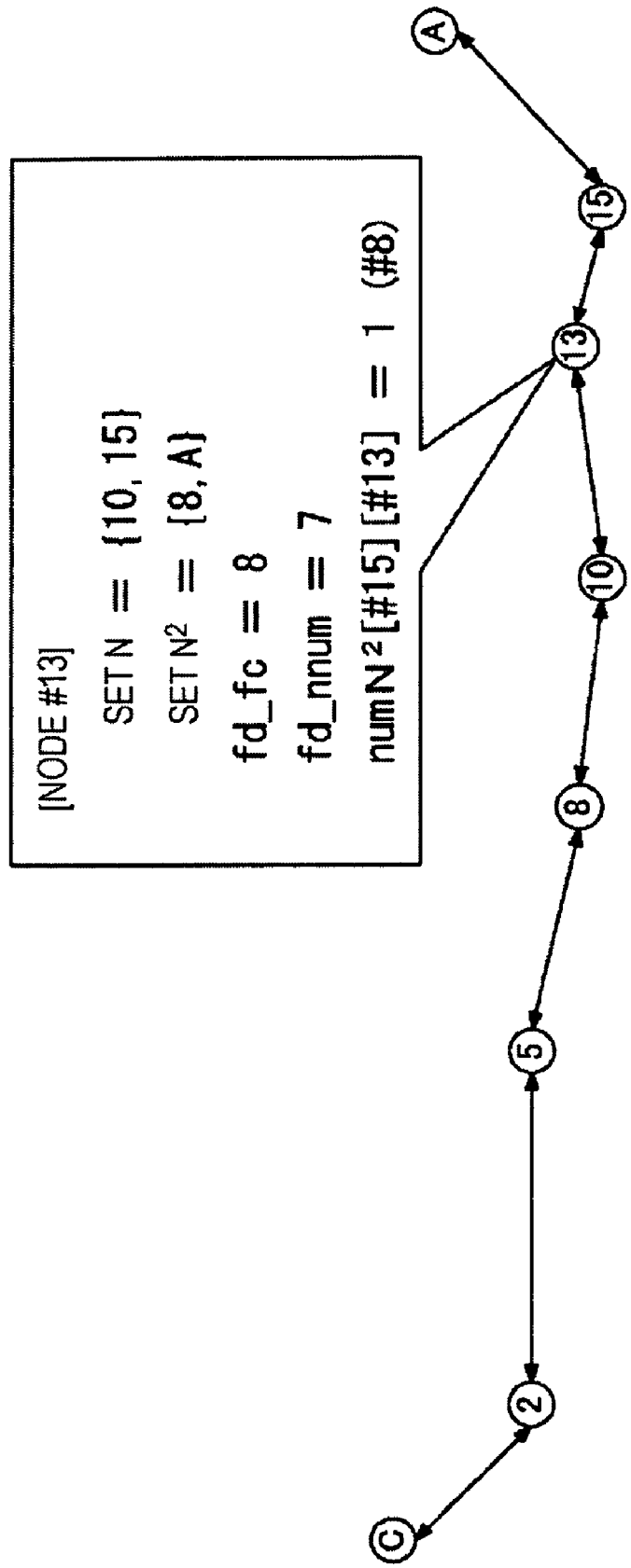
FIG. 15 also shows the second specific example.

As shown in FIG. 15, for the node #13, two nodes including the nodes #10 and #13 belong to set N. Further, two nodes including the nodes #8 and #A belong to set $N^2$. In that case, of the nodes belonging to set $N^2$ of the node #13, only the node #8 does not have a link to the node #15. Subsequently, the value of the node number numN$^2$[#15][#13] becomes "1", which does not exceed the value "7" of the propagation-node-number data 732. Therefore, a value indicating "transfer is not finished" is retained in the transfer-finish flag 733. Then, the value "6" is set in the propagation-node-number data 732, the value "7" is set in the transfer-number data 731, and the broadcast signal is transmitted. Of the nodes belonging to set N, only the node #10 that had not yet received the broadcast signal may receive the transmitted broadcast signal.

Figure 16:
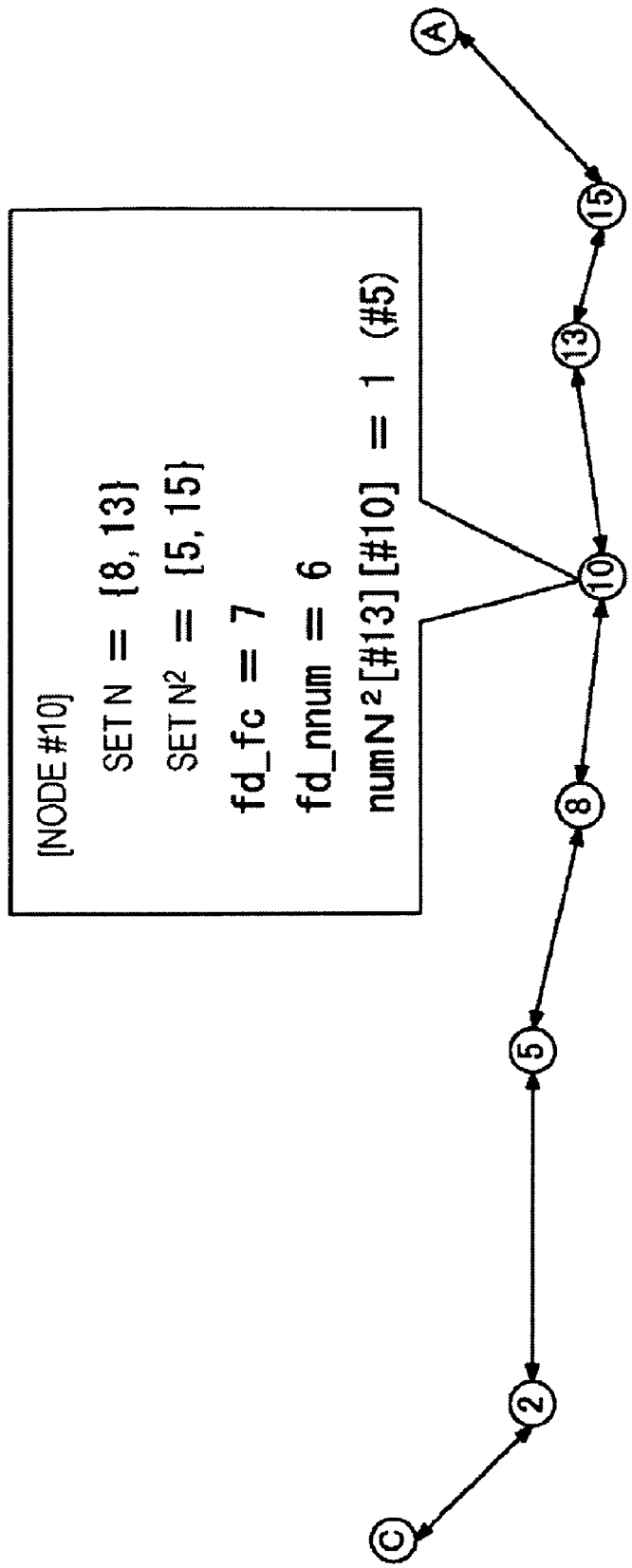
FIG. 16 also shows the second specific example.

As shown in FIG. 16, for the node #10, two nodes including the nodes #8 and #13 belong to set N. Further, two nodes including the nodes #5 and #15 belong to set $N^2$. In that case, of the nodes belonging to set $N^2$ of the node #10, only the node #5 does not have a link to the node #13. Subsequently, the value of the node number numN$^2$[#13] [#10] becomes "1", which does not exceed the value "6" of the propagation-node-number data 732. Therefore, a value indicating "transfer is not finished" is retained in the transfer-finish flag 733. Then, the value "5" is set in the propagation-node-number data 732, the value "6" is set in the transfer-number data 731, and the broadcast signal is transmitted. Of the nodes belonging to set N, only the node #8 that had not yet received the broadcast signal may receive the transmitted broadcast signal.

Figure 17:
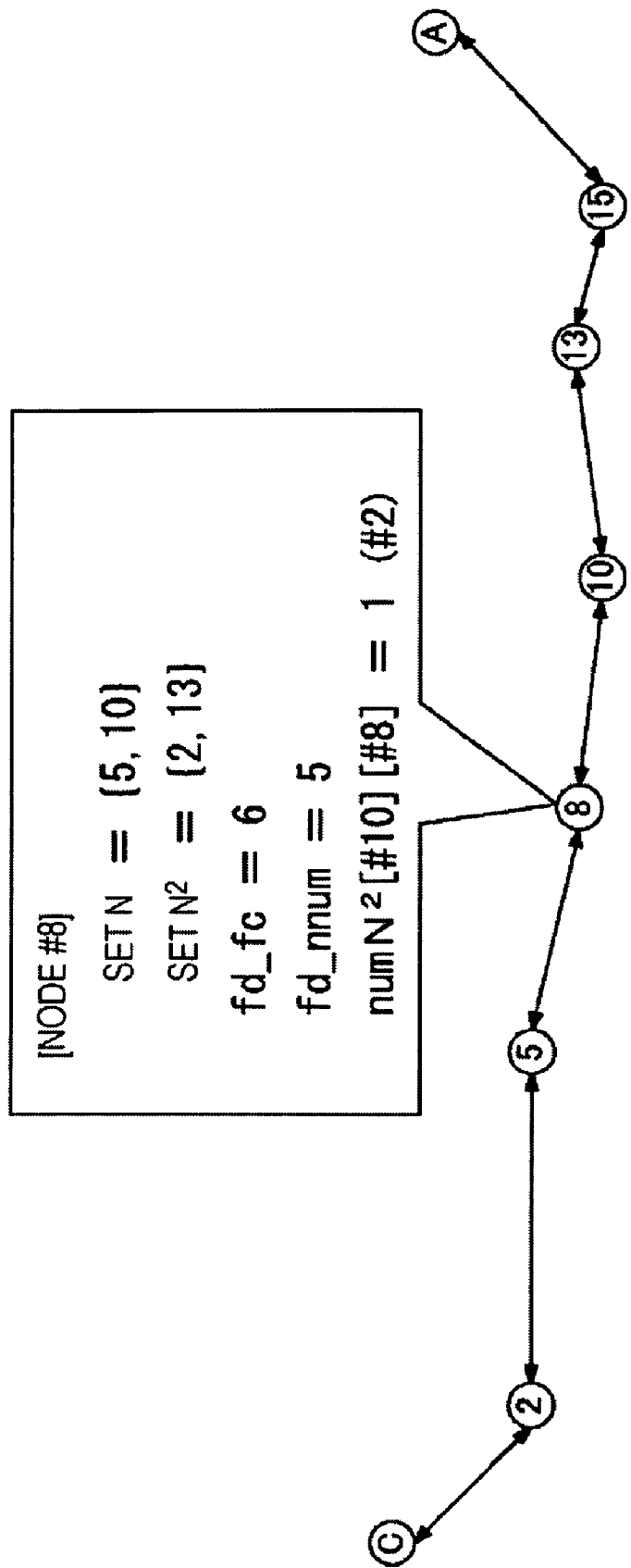
FIG. 17 also shows the second specific example.

As shown in FIG. 17, for the node #8, two nodes including the nodes #5 and #10 belong to set N. Further, two nodes including the nodes #2 and #13 belong to set $N^2$. In that case, of the nodes belonging to set $N^2$ of the node #8, only the node #2 does not have a link to the node #10. Subsequently, the value of the node number numN$^2$[#10] [#8] becomes "1", which does not exceed the value "5" of the propagation-node-number data 732. Therefore, a value indicating "transfer is not finished" is retained in the transfer-finish flag 733. Then, the value "4" is set in the propagation-node-number data 732, the value "5" is set in the transfer-number data 731, and the broadcast signal is transmitted. Of the nodes belonging to set N, only the node #5 that had not yet received the broadcast signal may receive the transmitted broadcast signal.

Figure 18:
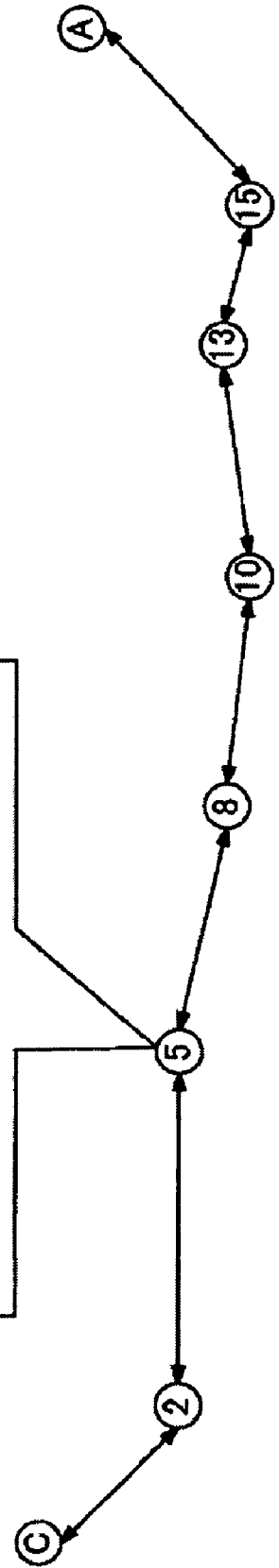
FIG. 18 also shows the second specific example.

As shown in FIG. 18, for the node #5, two nodes including the nodes #2 and #8 belong to set N. Further, two nodes including the nodes #C and #10 belong to set $N^2$. In that case, of the nodes belonging to set N of the node #5, only the node #C does not have a link to the node #8. Subsequently, the value of the node number numN$^2$[#8] [#5] becomes "1", which does not exceed the value "4" of the propagation-node-number data 732. Therefore, a value indicating "transfer is not finished" is retained in the transfer-finish flag 733. Then, the value "3" is set in the propagation-node-number data 732, the value "4" is set in the transfer-number data 731, and the broadcast signal is transmitted. Of the nodes belonging to set N, only the node #2 that had not yet received the broadcast signal may receive the transmitted broadcast signal.

Figure 19:
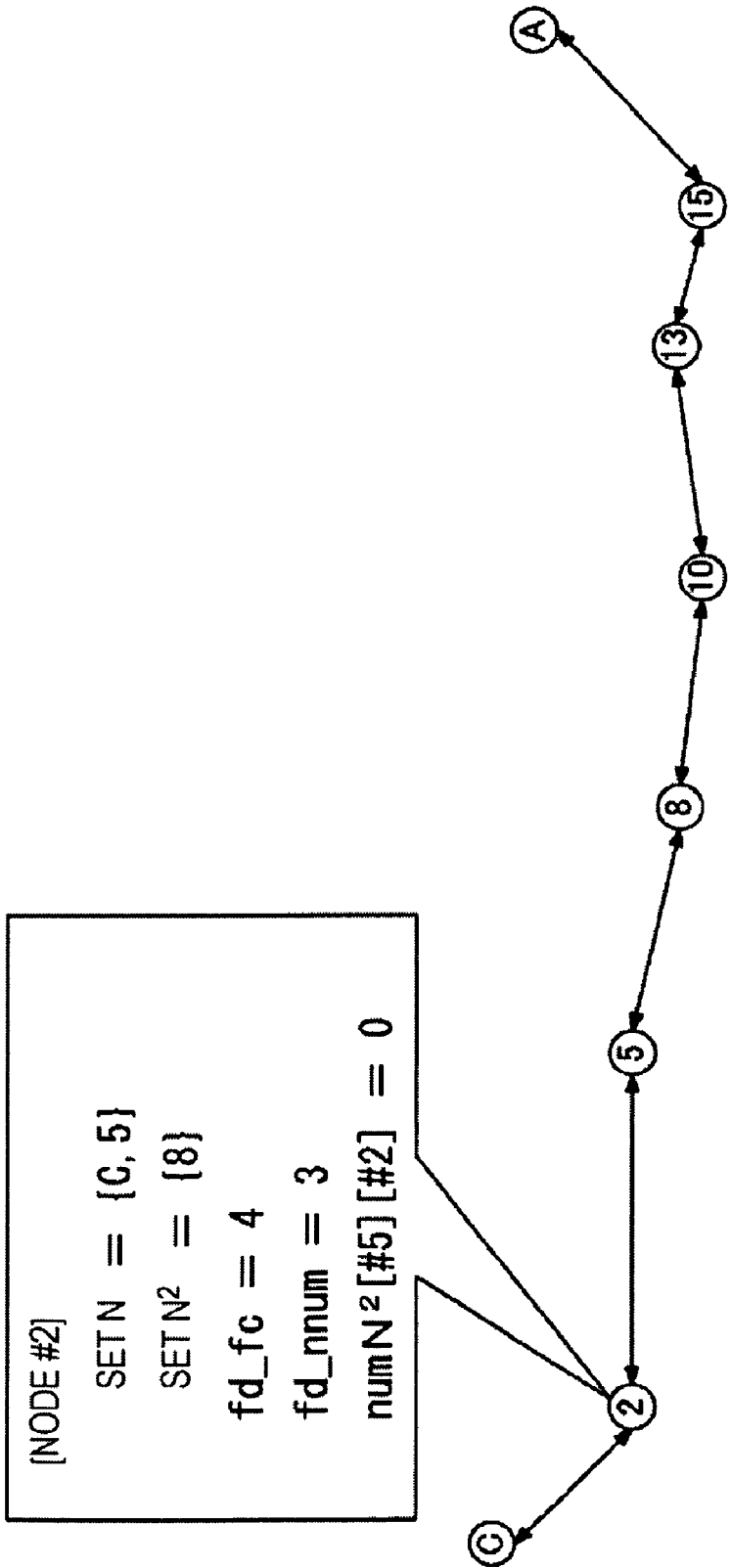
FIG. 19 also shows the second specific example.

As shown in FIG. 19, for the node #2, two nodes including the nodes #C and #5 belong to set N. Further, only the node #8 belongs to set $N^2$. In that case, set $N^2$ of the node #2 does not include any node having no link to the node #5. Subsequently, the value of the node number numN$^2$[#5] [#2] becomes "0", which does not exceed the value "3" of the propagation-node-number data 732. Therefore, a value indicating "transfer is not finished" is retained in the transfer-finish flag 733. Then, the value "2" is set in the propagation-node-number data 732, the value "3" is set in the transfer-number data 731, and the broadcast signal is transmitted. Of the nodes belonging to set N, only the node #C that had not yet received the broadcast signal may receive the transmitted broadcast signal.

Figure 20:
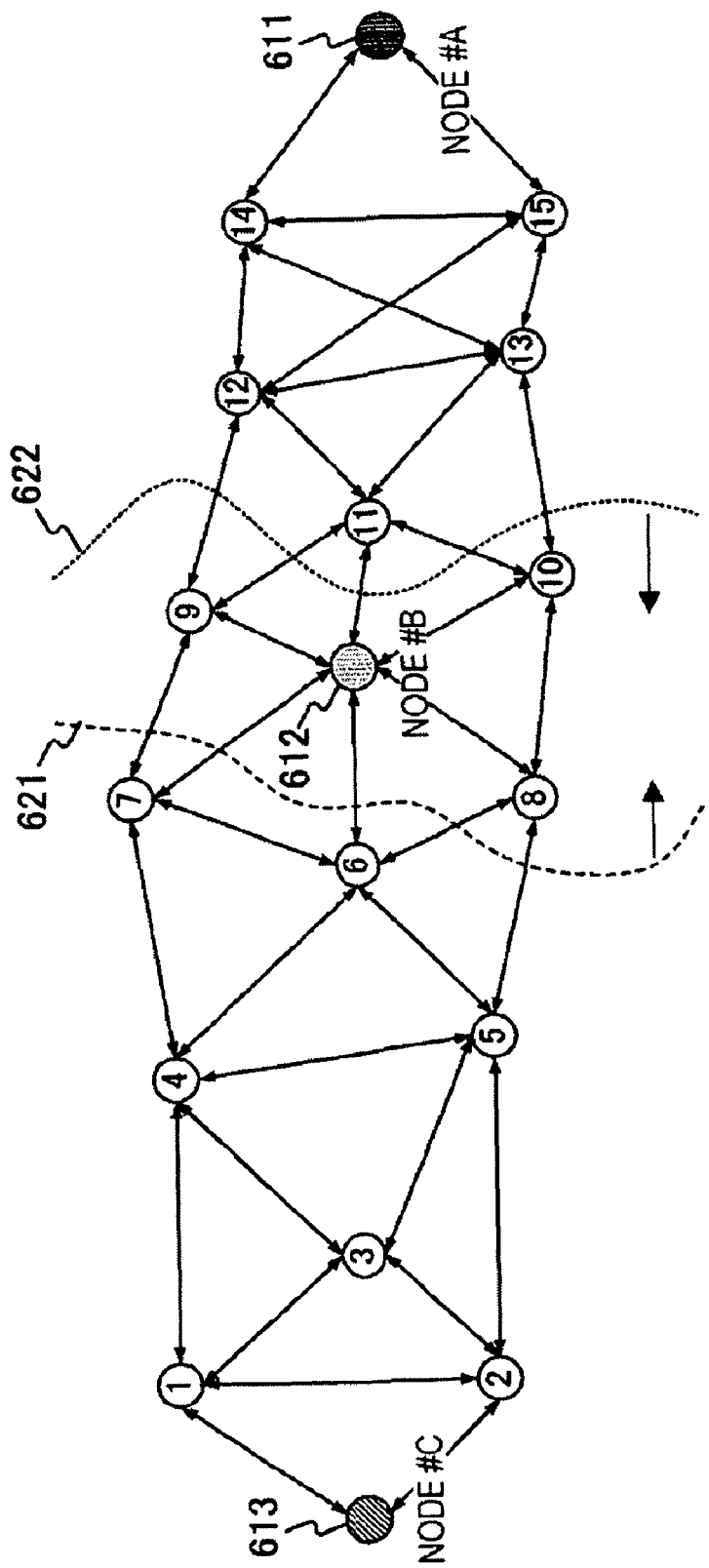
FIG. 20 shows the first example network topology.
Figure 21:
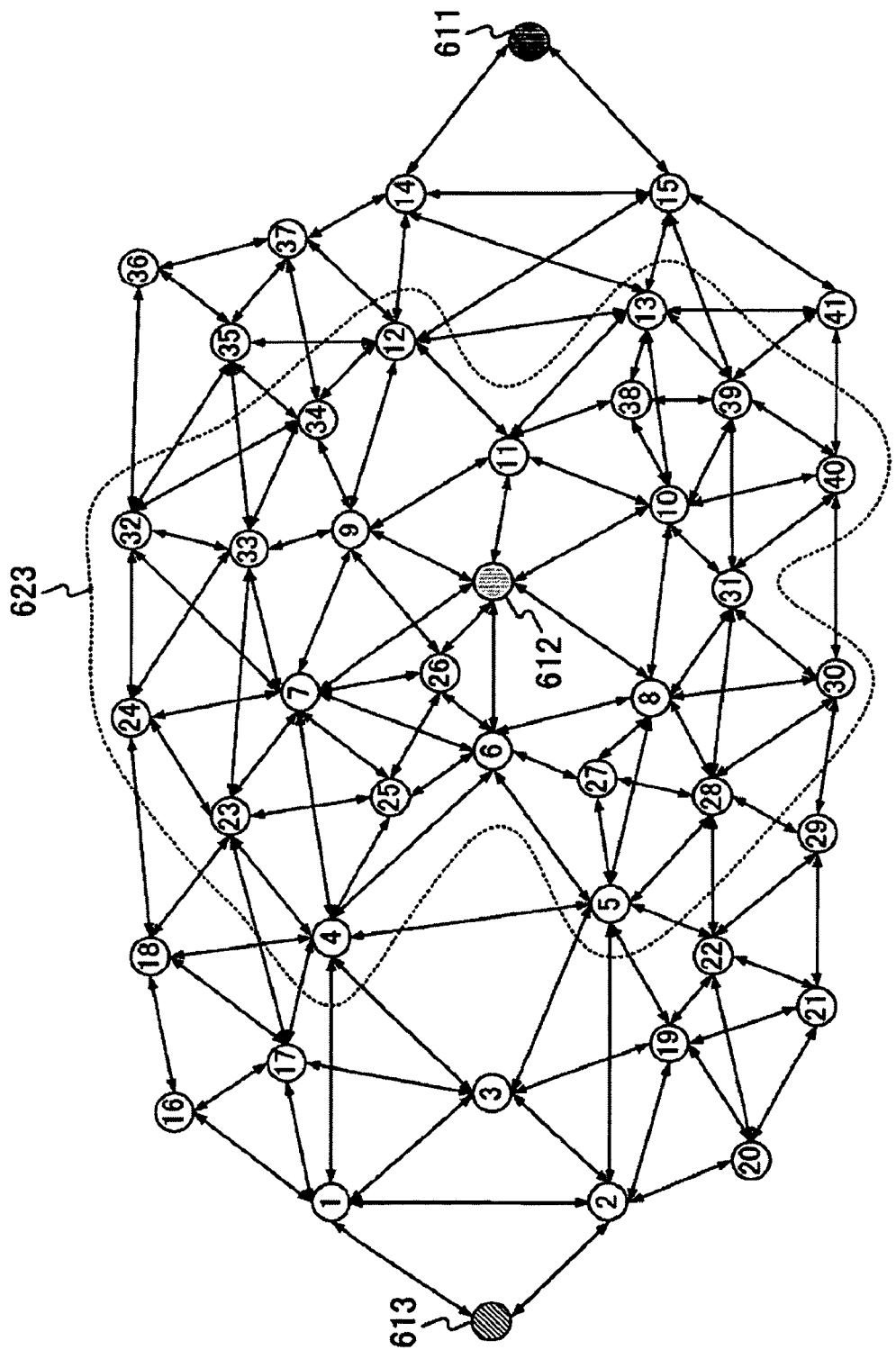
FIG. 21 shows the second example network topology.
Figure 22:
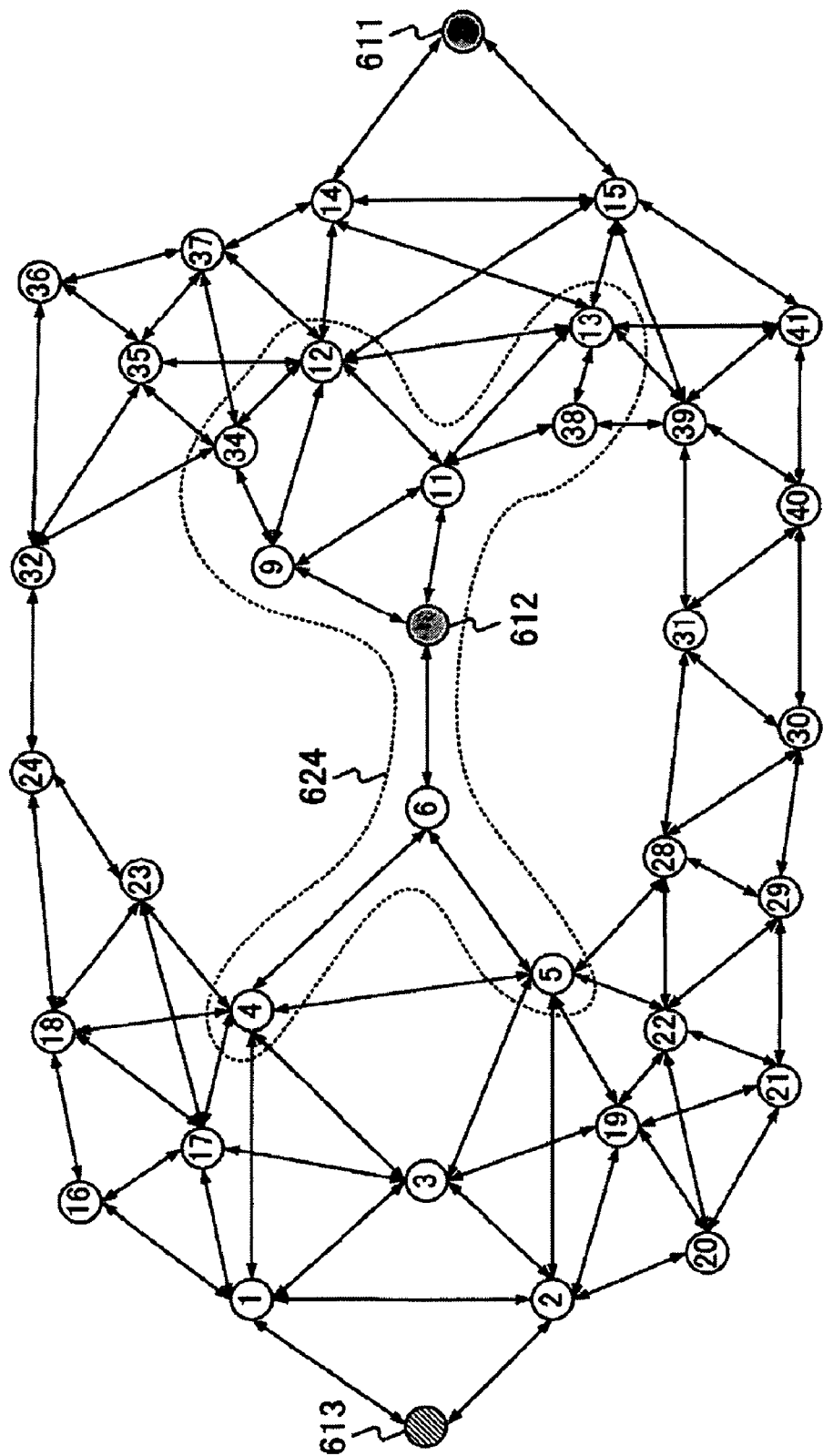
FIG. 22 shows the third example network topology.

The arrival of the broadcast signal at the node #C means that the broadcast signal is transmitted to every node of the network. Thus, it becomes possible to control the network size based on the propagation-node number even though the network topology spreads linearly. It is difficult to limit the network size only by reducing the transfer number in the case where the node number increases, as is the case with FIG. 20. According to the above-described embodiments, even though communications can be established with difficulty between terminals (the nodes #A and #C) provided at both ends of the network in the case where the node number increases, the flooding can be limited so that the network size is reduced to an expected network size appropriate for the node #A.

Thus, according to the above-described embodiments of the present invention, the propagation-node-number data 732 is set in the broadcast signal so that the range where the broadcast signal is transferred can be reduced with consideration given to the number of nodes to which the broadcast signal is propagated. Subsequently, the amount of traffic flowing in a dynamically changing wireless ad-hoc network can be limited so that the traffic amount becomes appropriate for expected applications and/or systems. Further, since a system ready for an expected network size can be constructed, operations of the system can be guaranteed and a highly reliable wireless ad-hoc network can be constructed.

The above-described embodiments of the present invention are disclosed, as examples provided to achieve the present invention. Although the above-described embodiments respectively correspond to matters to define the present invention, the matters being disclosed in the appended claims, as described below, various modifications, combinations, sub-combinations and alterations may occur depending on design requirements and other factors insofar as they are within the scope of the appended claims or the equivalents thereof.

Namely, in the appended claims, first identification-information storage corresponds to the set-N table 110, for example. Further, second identification-information storage corresponds to the set-$N^2$ table 120, for example. Further, a broadcast-signal-generation unit corresponds to the broadcast-signal-generation unit 160, for example. Further, a broadcast-signal-transfer unit corresponds to the broadcast-signal-transfer unit 170, for example.

Further, in one of the appended claims, a status-notification-signal-generation unit corresponds to the status-notification-signal-generation unit 150, for example. Further, a link-management unit corresponds to the link-management unit 140, for example.

Further, in the appended claims, the first identification-information storage corresponds to the set-N table 110, for example. Further, the second identification-information storage corresponds to the set-$N^2$ table 120, for example. Further, a finish-determination step corresponds to step S923, for example. Further, a finish-setting step corresponds to each of steps S925 and S926, for example. Further, a transfer step corresponds to step S929, for example.

Here, the processing procedures described in the above-described embodiments of the present invention may be understood, as a method having the processing procedures. Further, the processing procedures may be understood, as a program making a computer execute the processing procedures and/or a storage medium storing the program.

What is claimed is:

1. A wireless-communication device configured to communicate with a first different wireless-communication device provided outside a wireless-communication range through a path via a neighbor wireless-communication device, the wireless-communication device comprising:

first identification-information-storage means configured to store information corresponding to at least one first opposite station existing inside a first wireless-communication range of the device itself;

second identification-information-storage means configured to store information corresponding to at least one second opposite station existing inside a second wireless-communication range of the first opposite station and existing outside the first wireless-communication range;

broadcast-signal-generation means configured to generate a broadcast signal and transmit the generated broadcast signal to at least one second different wireless-communication device, where the broadcast signal includes a propagation-node number data calculated by subtracting a total number of a number of nodes of the first opposite station and a number of nodes of the second opposite station from a threshold value of the propagation-node number; and broadcast-signal-transfer means configured to set the transfer-finish-instruction signal for finishing transferring the broadcast signal if the propagation-node number data included in the broadcast signal is smaller than a number calculated by subtracting a number of the nodes of the second opposite station existing inside the second wireless-communication range of the first opposite station that transmitted the broadcast signal from the number of the nodes of the at least one second opposite station, and configured to set a number obtained by subtracting the number obtained by subtracting the number of the nodes of the second opposite station existing inside the second wireless-communication range of the first opposite station that transmitted the broadcast signal from the number of the nodes of the second opposite station from the propagation-node number data of the broadcast signal, as another propagation-node number data, and transfer the broadcast signal to at least a different wireless communication device when the transfer-finish-instruction signal of the broadcast signal transmitted from any of the at least one first opposite station does not instruct to finish transferring the broadcast signal.

2. The wireless-communication device according to claim 1, wherein the broadcast-signal-generation means incorporates data on a threshold value of a number of at least one time the broadcast signal should be transferred into the broadcast signal, as transfer-number data, and wherein the broadcastsignal-transfer means updates the transfer-number data incorporated into the broadcast signal each time the broadcast signal is transferred and stops transferring the broadcast signal when a value of the transfer-number data reaches a predetermined value.

3. The wireless-communication device according to claim 1, further comprising:
   status-notification-signal-generation means configured to generate a status-notification signal including the information about the first opposite station and transmit the status-notification signal to the first opposite station; and
   link-management means configured to update the first identification-information-storage means and the second identification-information-storage means based on the information about the first opposite station, where the information about the first opposite station is included in the status-notification signal transmitted from the first opposite station.

4. A wireless-communication system, comprising:
   a plurality of wireless-communication devices, each of which communicates with a first different wireless-communication device provided outside a wireless-communication range through a path via a neighbor wireless-communication device, and where each of the wireless-communication devices comprises:
      first identification-information-storage means configured to store information corresponding to at least one first opposite station existing inside a first wireless communication range of the device itself;
      second identification-information-storage means configured to store information corresponding to at least one second opposite station existing inside a second wireless-communication range of the first opposite station and existing outside the first wireless communication range;
      broadcast-signal-generation means configured to generate a broadcast signal and transmit the generated broadcast signal to at least one second different wireless communication device, where the broadcast signal includes a propagation-node number data calculated by subtracting a total number of a number of nodes of the first opposite station and a number of nodes of the second opposite station from a threshold value of the propagation-node number; and
      broadcast-signal-transfer means configured to set the transfer-finish-instruction signal for finishing transferring the broadcast signal if the propagation-node number data included in the broadcast signal is smaller than a number calculated by subtracting a number of the nodes of the second opposite station existing inside the second wireless-communication range of the first opposite station that transmitted the broadcast signal from the number of the nodes of the at least one second opposite station, and configured to set a number obtained by subtracting the number obtained by subtracting the number of the nodes of the second opposite station existing inside the second wireless-communication range of the first opposite station that transmitted the broadcast signal from the number of the nodes of the second opposite station from the propagation-node number data of the broadcast signal, as another propagation-node number data, and transfer the broadcast signal to at least a different wireless communication device when the transfer-finish-instruction signal of the broadcast signal transmitted from any of the at least one first opposite station does not instruct to finish transferring the broadcast signal.

5. A wireless-communication method used in a case where each of wireless-communication devices communicates with a first different wireless-communication device provided outside a wireless-communication range through a path via a neighbor wireless-communication device, the wireless-communication method comprising the steps of:
   determining whether or not a transfer-finish-instruction signal of a broadcast signal transmitted from any of the at least one first opposite station instructs to finish transferring the broadcast signal;
   setting the transfer-finish-instruction signal for finishing transferring the broadcast signal if a propagation-node number data included in the broadcast signal is smaller than a number calculated by subtracting a number of the nodes of a second opposite station existing inside a second wireless-communication range of the first opposite station that transmitted the broadcast signal from the number of the nodes of the at least one second opposite station when the transfer-finish-instruction signal does not instruct to finish transferring the broadcast signal; and
   setting a number obtained by subtracting the number obtained by subtracting the number of the nodes of the second opposite station existing inside the second wireless-communication range of the first opposite station that transmitted the broadcast signal from the number of the nodes of the second opposite station from the propagation-node number data of the broadcast signal, as another propagation-node number data, and transferring the broadcast signal to at least a different wireless-communication device when the transfer-finish-instruction signal does not instruct to finish transferring the broadcast signal,
   wherein the wireless-communication device includes
      first identification-information-storage means configured to store information corresponding to at least one first opposite station existing inside a first wireless communication range of the device itself, and
      second identification-information-storage means configured to store information corresponding to at least one second opposite station existing inside a second wireless-communication range of the first opposite station and existing outside the first wireless communication range.

6. A non-transitory computer readable storage medium having stored therein a computer program for causing a computer provided in each of wireless-communication devices to execute the steps of:
   determining whether or not a transfer-finish-instruction signal of a broadcast signal transmitted from any of the at least one first opposite station instructs to finish transferring the broadcast signal;
   setting the transfer-finish-instruction signal, for finishing transferring the broadcast signal if a propagation-node number data included in the broadcast signal is smaller than a number calculated by subtracting a number of the nodes of a second opposite station existing inside a second wireless-communication range of the first opposite station that transmitted the broadcast signal from the number of the nodes of the at least one second opposite station when the transfer-finish-instruction signal does not instruct to finish transferring the broadcast signal; and setting a number obtained by subtracting the number obtained by subtracting the number of the nodes of the second opposite station existing inside the second wireless-communication range of the first opposite station that transmitted the broadcast signal from the number of the nodes of the second opposite station from the propagation-node number data of the broadcast signal, as another propagation-node number data, and transferring the broadcast signal to at least a different wireless-communication device when the transfer-finish-instruction signal does not instruct to finish transferring the broadcast signal, wherein the wireless-communication device communicates with a first different wireless-communication device provided outside a wireless-communication range through a path via a neighbor wireless-communication device, and wherein the wireless-communication device includes first identification-information-storage means configured to store information corresponding to at least one first opposite station existing inside a first wireless-communication range of the device itself, and second identification-information-storage means configured to store information corresponding to at least one second opposite station existing inside a second wireless-communication range of the first opposite station and existing outside the first wireless communication range.

7. A wireless-communication device configured to communicate with a first different wireless-communication device provided outside a wireless-communication range through a path via a neighbor wireless-communication device, the wireless-communication device comprising:

first identification-information storage configured to store information corresponding to at least one first opposite station existing inside a first wireless-communication range of the device itself;

second identification-information storage configured to store information corresponding to at least one second opposite station existing inside a second wireless communication range of the first opposite station and existing outside the first wireless-communication range;

a broadcast-signal-generation unit configured to generate a broadcast signal and transmit the generated broadcast signal to at least one second different wireless-communication device, where the broadcast signal includes a propagation-node number data calculated by subtracting a total number of a number of nodes of the first opposite station and a number of nodes of the second opposite station from a threshold value of the propagation-node number; and a broadcast-signal-transfer unit configured to set the transfer-finish-instruction signal for finishing transferring the broadcast signal if the propagation-node number data included in the broadcast signal is smaller than a number calculated by subtracting a number of the nodes of the second opposite station existing inside the second wireless-communication range of the first opposite station that transmitted the broadcast signal from the number of the nodes of the at least one second opposite station, and configured to set a number obtained by subtracting the number obtained by subtracting the number of the nodes of the second opposite station existing inside the second wireless-communication range of the first opposite station that transmitted the broadcast signal from the number of the nodes of the second opposite station from the propagation-node number of the broadcast signal, as another propagation-node number data, and transfer the broadcast signal to at least a different wireless communication device when the transfer-finish-instruction signal of the broadcast signal transmitted from any of the at least one first opposite station does not instruct to finish transferring the broadcast signal.

8. A wireless-communication system, comprising:

a plurality of wireless-communication devices, each of which communicates with a first different wireless-communication device provided outside a wireless-communication range through a path via a neighbor wireless-communication device, and where each of the wireless-communication devices comprises:

first identification-information storage configured to store information corresponding to at least one first opposite station existing inside a first wireless-communication range of the device itself;

second identification-information storage configured to store information corresponding to at least one second opposite station existing inside a second wireless communication range of the first opposite station and existing outside the first wireless-communication range;

a broadcast-signal-generation unit configured to generate a broadcast signal and transmit the generated broadcast signal to at least one second different wireless communication device, where the broadcast signal includes a propagation-node number data calculated by subtracting a total number of a number of nodes of the first opposite station and a number of nodes of the second opposite station from a threshold value of the propagation-node number; and a broadcast-signal-transfer unit configured to set the transfer-finish-instruction signal for finishing transferring the broadcast signal if the propagation-node number data included in the broadcast signal is smaller than a number calculated by subtracting a number of the nodes of the second opposite station existing inside the second wireless-communication range of the first opposite station that transmitted the broadcast signal from the number of the nodes of the at least one second opposite station, and configured to set a number obtained by subtracting the number obtained by subtracting the number of the nodes of the second opposite station existing inside the second wireless-communication range of the first opposite station that transmitted the broadcast signal from the number of the second opposite station from the propagation-node number data of the broadcast signal, as another propagation-node number data, and transfer the broadcast signal to at least a different wireless communication device when the transfer-finish-instruction signal of the broadcast signal transmitted from any of the at least one first opposite station does not instruct to finish transferring the broadcast signal.

* * * * *